US012537141B2

(12) United States Patent
Takahashi

(10) Patent No.: US 12,537,141 B2
(45) Date of Patent: Jan. 27, 2026

(54) CAPACITOR MODULE AND A METHOD OF MAKING THEREOF WITH PLURALITY OF BUS BARS

(71) Applicant: Murata Manufacturing Co., Ltd., Nagaokakyo (JP)

(72) Inventor: Nobuyuki Takahashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 503 days.

(21) Appl. No.: 17/971,840

(22) Filed: Oct. 24, 2022

(65) Prior Publication Data
US 2023/0038001 A1    Feb. 9, 2023

Related U.S. Application Data

(63) Continuation of application No. PCT/JP2021/016214, filed on Apr. 21, 2021.

(30) Foreign Application Priority Data

Apr. 28, 2020   (JP) ................................. 2020-079431

(51) Int. Cl.
*H01G 4/38*       (2006.01)
*H01G 4/01*       (2006.01)
(Continued)

(52) U.S. Cl.
CPC ................. *H01G 4/38* (2013.01); *H01G 4/01* (2013.01); *H01G 4/224* (2013.01); *H01G 4/228* (2013.01)

(58) Field of Classification Search
CPC .. H01G 2/02; H01G 2/10; H01G 4/32; H01G 4/228; H01G 4/224; H01G 4/01; H01G 4/38
See application file for complete search history.

(56) References Cited

U.S. PATENT DOCUMENTS 8,315,031 B2 * 11/2012 Kyouda .................. H01G 9/10
                                                        361/301.3
9,818,988 B2    11/2017 Juventin et al.
(Continued)

FOREIGN PATENT DOCUMENTS

JP          S60721 A    1/1985
JP     2000195748 A    7/2000
(Continued)

OTHER PUBLICATIONS

International Search Report in PCT/JP2021/016214, mailed Jul. 13, 2021, 3 pages.

*Primary Examiner* — David M Sinclair
(74) *Attorney, Agent, or Firm* — ArentFox Schiff LLP

(57) ABSTRACT

A capacitor module is provided with a case with a bottom surface and an opening, a first capacitor group including first capacitors each having first and second electrodes, and a side surface connecting the first and second electrodes, a second capacitor group including second capacitors each having third and fourth electrodes, and a side surface connecting the third and fourth electrodes, a first bus bar having an electrode contact portion in contact with the first electrode, a second bus bar having an electrode contact portion in contact with the third electrode, a third bus bar having an electrode contact portion commonly in contact with the second electrode and the fourth electrode, a sealing resin filled in the case; and an insulating member provided between the electrode contact portion of the first bus bar and the electrode contact portion of the second bus bar and surrounded by the sealing resin.

18 Claims, 33 Drawing Sheets

(51) Int. Cl.
  *H01G 4/224*    (2006.01)
  *H01G 4/228*    (2006.01)

(56)           References Cited

U.S. PATENT DOCUMENTS

2015/0024254 A1    1/2015   Juventin et al.
2021/0343474 A1*   11/2021  Kawahata ............... H01F 27/30

FOREIGN PATENT DOCUMENTS

| | | | | |
|---|---|---|---|---|
| JP | 2001210548 A   | | 8/2001  | |
| JP | 2006216618 A   | | 8/2006  | |
| JP | 2007201117 A  * | 8/2007 | ............ H01G 4/224 |
| JP | 2007311634 A   | | 11/2007 | |
| JP | 2008130640 A   | | 6/2008  | |
| JP | 2010219259 A   | | 9/2010  | |
| JP | 2016152243 A  * | 8/2016  | |
| JP | 2017045955 A   | | 3/2017  | |
| JP | 2017195285 A   | | 10/2017 | |
| JP | 2018170410 A   | | 11/2018 | |
| JP | 2020167215 A  * | 10/2020 | ............ H01G 4/224 |
| JP | 2020167270 A  * | 10/2020 | |
| KR | 101273255 B1 * | 6/2013  | |
| WO | 2013/132093 A1 | | 9/2013  | |

\* cited by examiner

CAPACITOR MODULE AND A METHOD OF MAKING THEREOF WITH PLURALITY OF BUS BARS

CROSS REFERENCE TO RELATED APPLICATIONS

This application is a continuation of International Application No. PCT/JP2021/016214, filed Apr. 21, 2021, which claims priority to Japanese Patent Application No. 2020-079431, filed Apr. 28, 2020, the entire contents of each of which are hereby incorporated in their entirety.

TECHNICAL FIELD

The present disclosure is directed to a capacitor module.

BACKGROUND OF THE INVENTION

There is known a capacitor module in which one or a plurality of capacitors formed by winding or layering a dielectric film having a metal film on the surface are housed in a case, and bus bars are connected to electrodes at both ends of each capacitor.

For example, JP 2001-210548A (the "JP '548 Publication") discloses a film capacitor in which a capacitor element and an electronic component are separately housed with a partition plate provided on a bottom surface of a case.

The film capacitor described in the JP '548 Publication still has room for improvement in terms of enhancement in insulation.

SUMMARY OF THE INVENTION

Therefore, an object of the present disclosure is to provide a capacitor module with improved insulation.

In an exemplary aspect, a capacitor module is provided that includes: a case with an opening provided at a position opposing a bottom surface; a first capacitor group disposed inside the case and including one or a plurality of first capacitors each having a first electrode, a second electrode, and a side surface connecting the first electrode and the second electrode; a second capacitor group disposed inside the case and including one or a plurality of second capacitors each having a third electrode, a fourth electrode, and a side surface connecting the third electrode and the fourth electrode; a first bus bar having a plate shape, the first bus bar being disposed on the opening side with respect to the first capacitor group inside the case and having an electrode contact portion in contact with the first electrode; a second bus bar having a plate shape, the second bus bar being disposed on the opening side with respect to the second capacitor group inside the case and having an electrode contact portion in contact with the third electrode; a third bus bar disposed on the bottom surface side with respect to the first capacitor group and the second capacitor group inside the case and having an electrode contact portion commonly in contact with the second electrode and the fourth electrode; a sealing resin with which the case is filled; and an insulating member provided between the electrode contact portion of the first bus bar and the electrode contact portion of the second bus bar and surrounded by the sealing resin.

Thus, according to the present disclosure, a capacitor module is provided with improved insulation.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a mode of use, further features and advances thereof, will be understood by reference to the following detailed description of illustrative implementations of the disclosure when read in conjunction with reference to the accompanying drawings, wherein.

DETAILED DESCRIPTION

Figure 1:
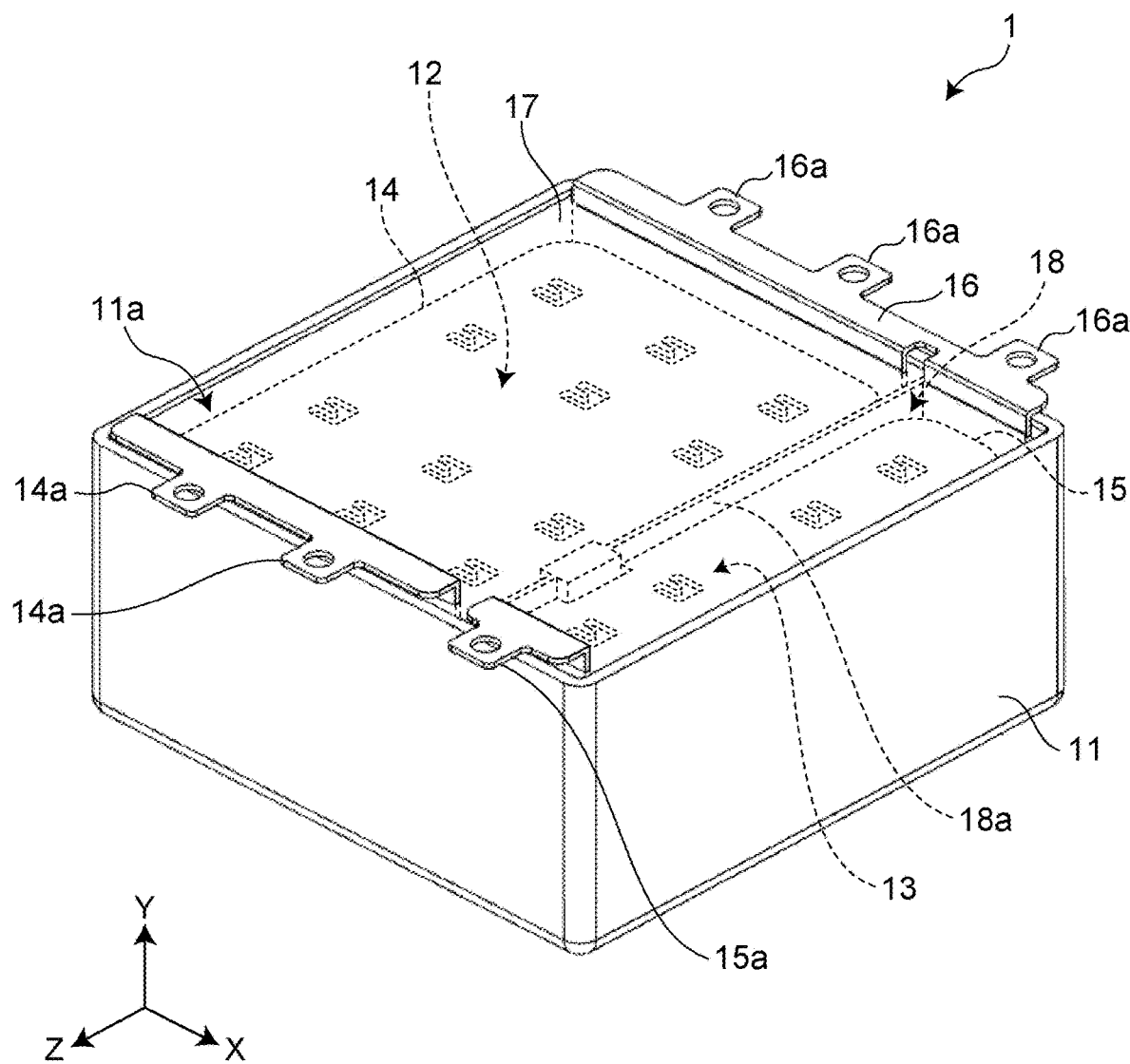
FIG. 1 is a perspective view schematically illustrating a capacitor module in accordance with aspects of the present disclosure.

A capacitor module having two or more capacitor groups having different functions is known in the art. For example, there is a capacitor module in which each capacitor group is housed in one case and the case is filled with an insulating resin. Each capacitor group includes one or more capacitors. Each capacitor group is insulated by the insulating resin filled in the case. However, in the case of such configuration, there is a problem that insulation quality is deteriorated due to bubbles generated in the insulating resin.

Aspects of the present disclosure is directed to improving insulation between capacitor groups in a capacitor module having two or more capacitor groups.

A capacitor module according to an exemplary aspect of the present disclosure includes a case with an opening provided at a position opposing a bottom surface; a first capacitor group disposed inside the case and including one or a plurality of first capacitors each having a first electrode, a second electrode, and a side surface connecting the first electrode and the second electrode; a second capacitor group disposed inside the case and including one or a plurality of second capacitors each having a third electrode, a fourth electrode disposed on the bottom surface side, and a side surface connecting the third electrode and the fourth electrode; a first bus bar having a plate shape, the first bus bar being disposed on the opening side with respect to the first capacitor group inside the case and having an electrode contact portion in contact with the first electrode; a second bus bar having a plate shape, the second bus bar being disposed on the opening side with respect to the second capacitor group inside the case and having an electrode contact portion in contact with the third electrode; a third bus bar disposed on the bottom surface side with respect to the first capacitor group and the second capacitor group inside the case and having an electrode contact portion commonly in contact with the second electrode and the fourth electrode; a sealing resin with which the case is filled; and an insulating member provided between the electrode contact portion of the first bus bar and the electrode contact portion of the second bus bar and surrounded by the sealing resin.

According to this configuration, a capacitor module is provided with improved insulation.

The insulating member may be disposed such that, in a direction from the opening toward the bottom surface, one end portion is positioned on the opening side relative to the electrode contact portion of the first bus bar and the electrode contact portion of the second bus bar, and another end portion is positioned on the bottom surface side relative to the first electrode and the third electrode.

According to this configuration, the insulation distance of each capacitor group can be secured while reducing the distance between the first capacitor group and the second capacitor group. Therefore, it is possible to achieve downsizing of the capacitor module while improving the insulation.

In an exemplary aspect, a recess that receives the insulating member in a direction from the opening toward the bottom surface may be provided on an inner side surface of the case.

According to this configuration, positional displacement of the insulating member in the case can be prevented.

In an exemplary aspect, the third bus bar may further have an extending portion extending to an outside of the case through the opening along a side surface of the case from the electrode contact portion of the third bus bar, and a through hole through which the insulating member passes may be provided in the extending portion.

According to this configuration, interference between the third bus bar and the insulating member can be prevented.

In an exemplary aspect, the insulating member may be positioned by being received by the third bus bar at one end on the bottom surface side of the through hole.

According to this configuration, it may not be necessary to provide a recess in the case, and therefore it is possible to reduce the manufacturing cost.

Moreover, the insulating member may include a first portion extending along between the electrode contact portion of the first bus bar and the electrode contact portion of the second bus bar, and a second portion extending so as to intersect with respect to the first portion and extending so as to be positioned on the bottom surface side of the case with respect to a surface on the first electrode side of the electrode contact portion of the first bus bar and a surface on the third electrode side of the electrode contact portion of the second bus bar.

According to this configuration, uplift due to buoyancy of the sealing resin of the insulating member can be prevented.

Moreover, the side surface of the first capacitor and the side surface of the second capacitor may each include a pair of flat portions opposing each other and a pair of curved portions connecting the pair of flat portions, and the second portion of the insulating member may be disposed between the adjacent curved portions of the adjacent first capacitors and between the adjacent curved portions of the adjacent second capacitors.

According to this configuration, the second portion can be disposed in an empty space between the capacitors, which contributes to downsizing of the capacitor module.

Furthermore, the second portion of the insulating member may have a protrusion, and the protrusion may be inserted into a hole provided in each of the first bus bar and the second bus bar.

According to this configuration, it is possible to easily position the insulating member.

In another exemplary aspect, the second portion of the insulating member may have a recess, and the capacitor module may further comprise a screw inserted into a hole provided in each of the first bus bar and the second bus bar and the recess.

According to this configuration, it is possible to easily position the insulating member.

Moreover, the bottom surface of the case may be flat.

According to this configuration, the filling property of the sealing resin can also be improved.

Figure 2:
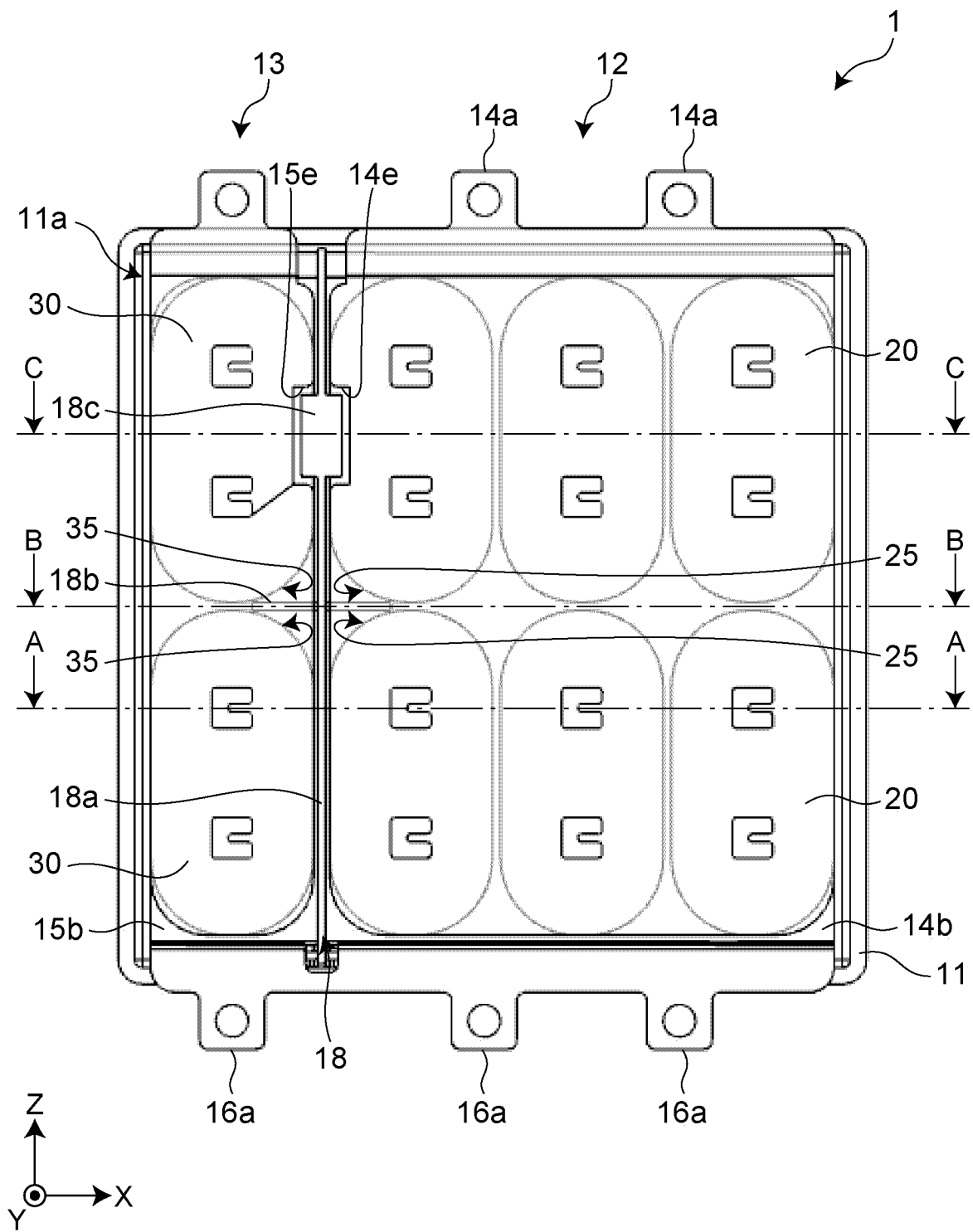
FIG. 2 is a plan view of the capacitor module of FIG. 1.
Figure 3A:
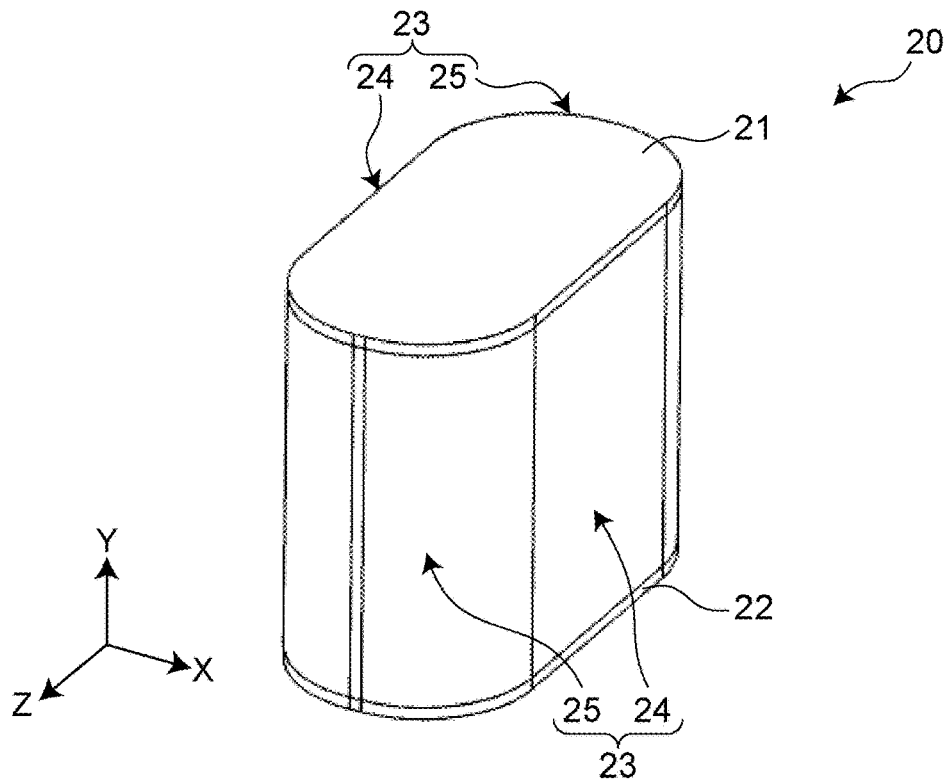
FIG. 3A is a perspective view illustrating a first capacitor included in a first capacitor group of the capacitor module of FIG. 1.
Figure 3B:
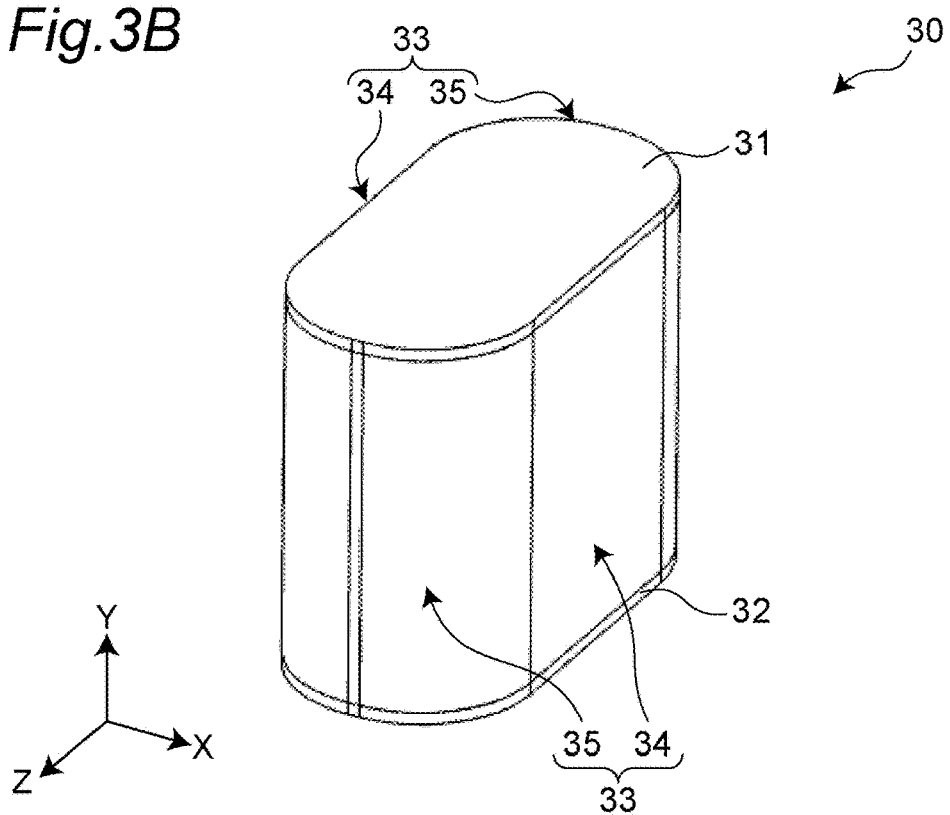
FIG. 3B is a perspective view illustrating a second capacitor included in a second capacitor group of the capacitor module of FIG. 1.
Figure 4:
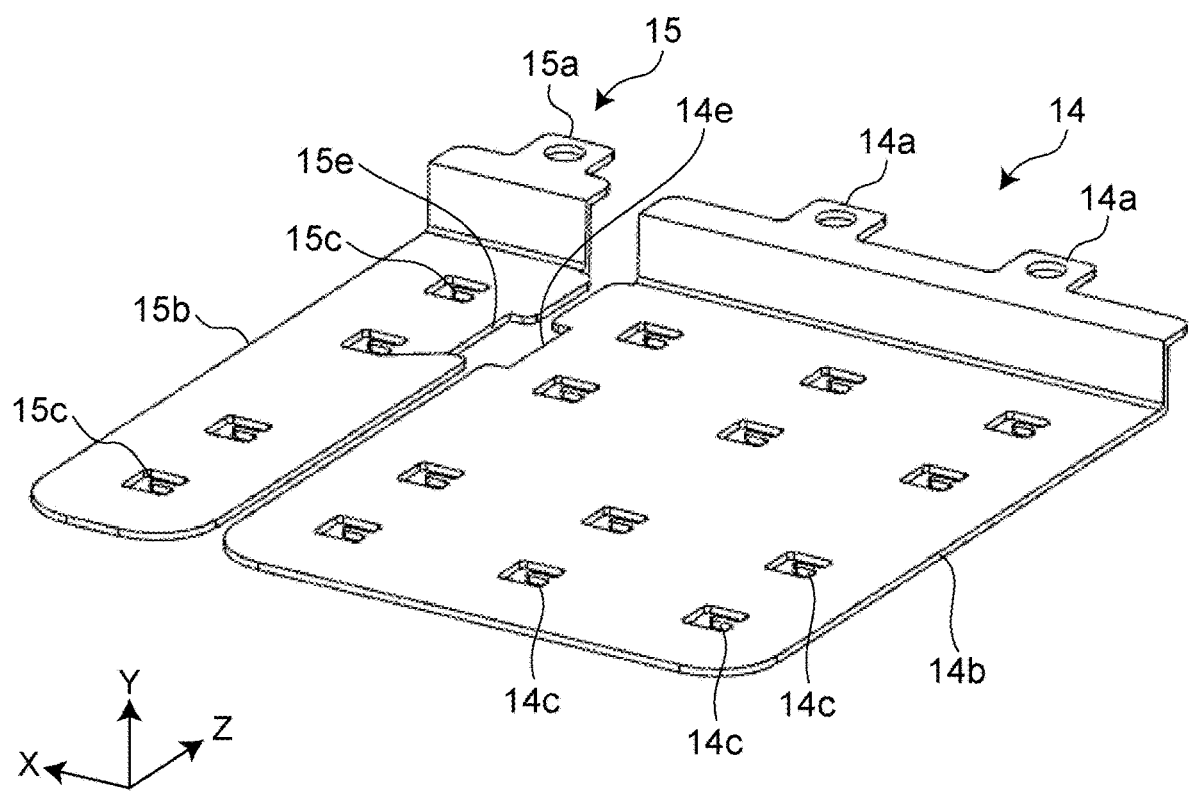
FIG. 4 is a perspective view illustrating a first bus bar and a second bus bar included in the capacitor module of FIG. 1.
Figure 5:
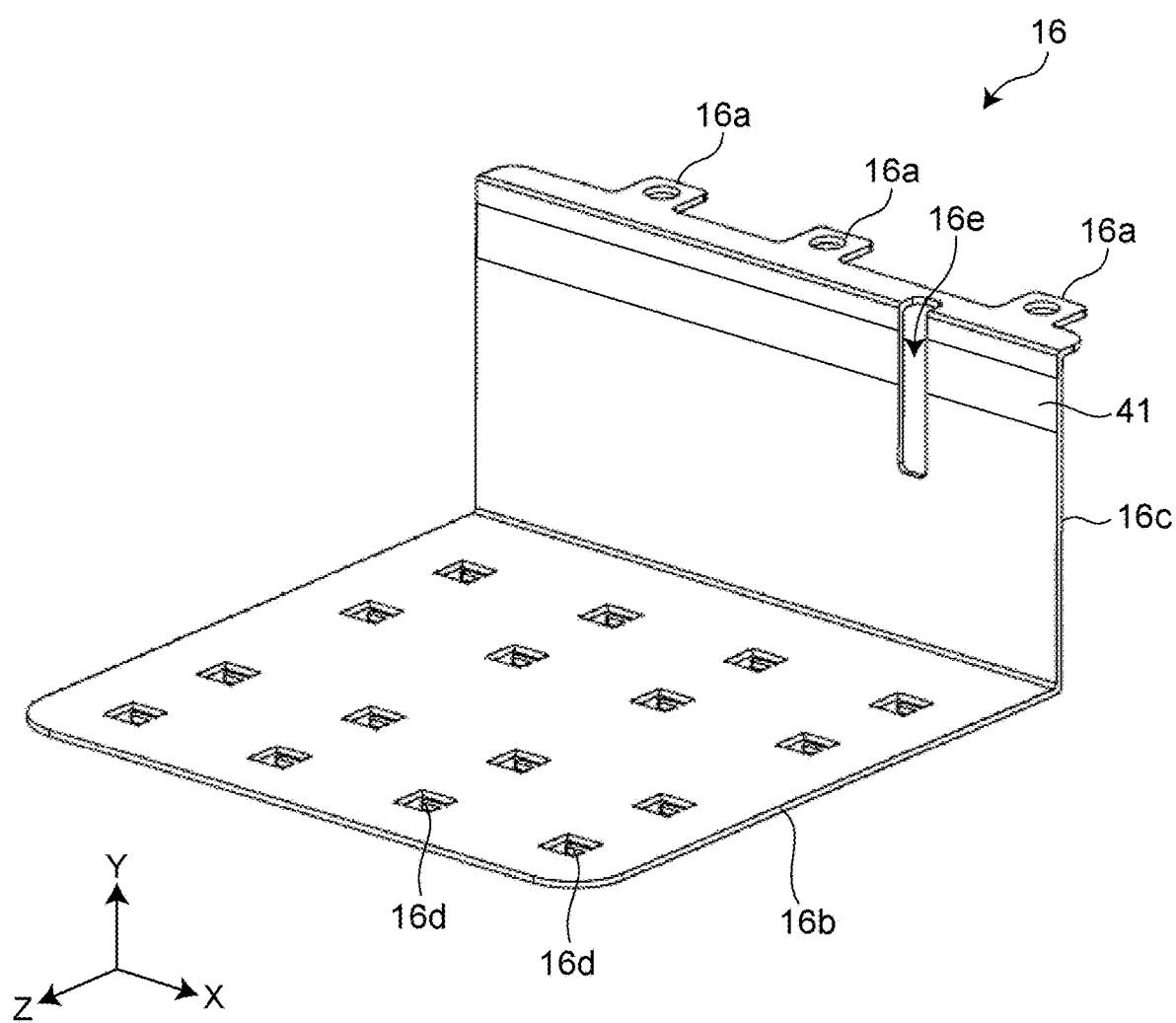
FIG. 5 is a perspective view illustrating a third bus bar included in the capacitor module of FIG. 1.
Figure 6:
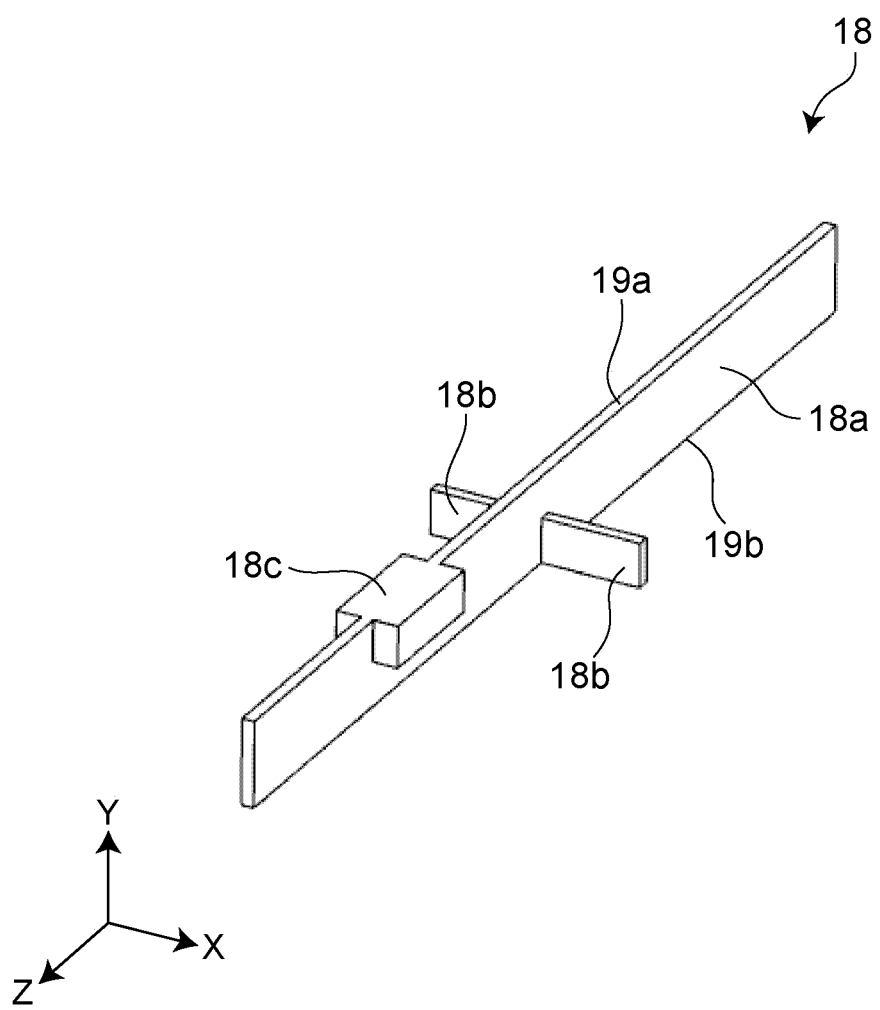
FIG. 6 is a perspective view illustrating an insulating member included in the capacitor module of FIG. 1.
Figure 7:
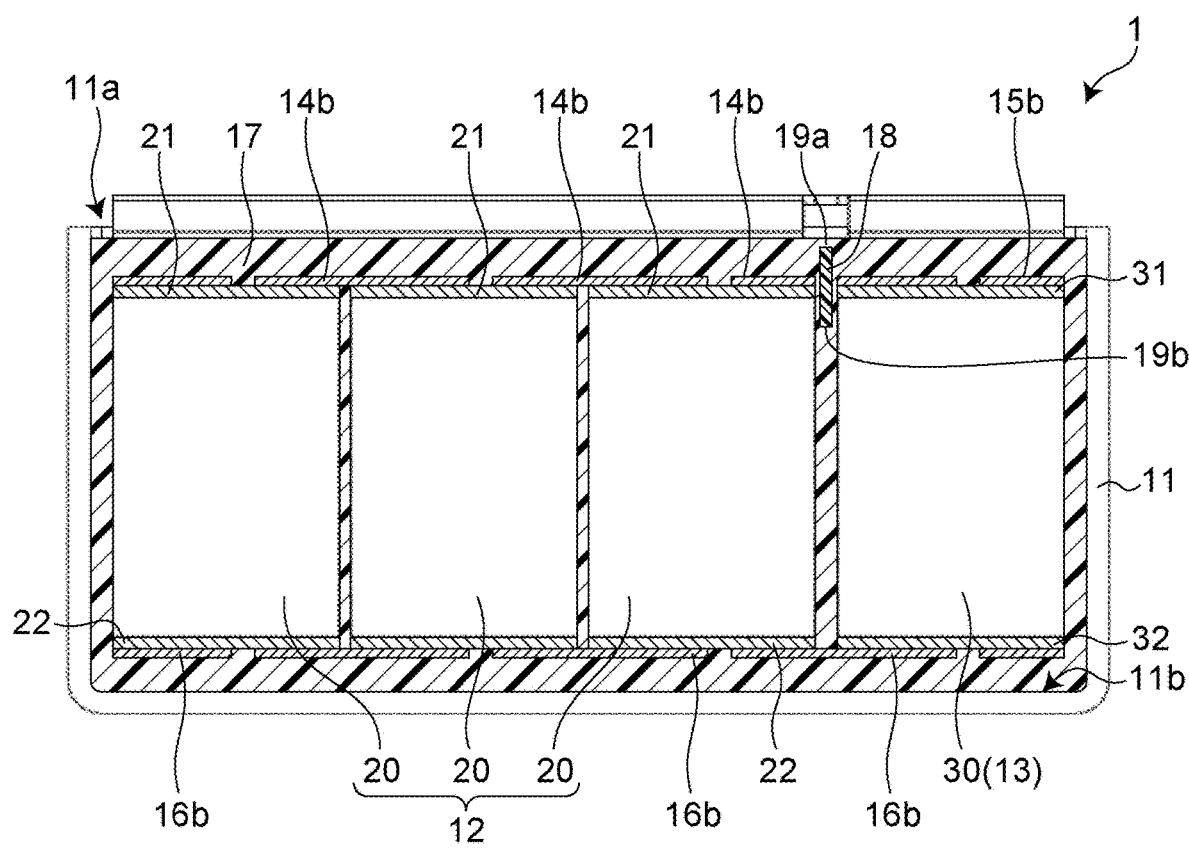
FIG. 7 is a cross-sectional view taken along line A-A of FIG. 2.
Figure 8:
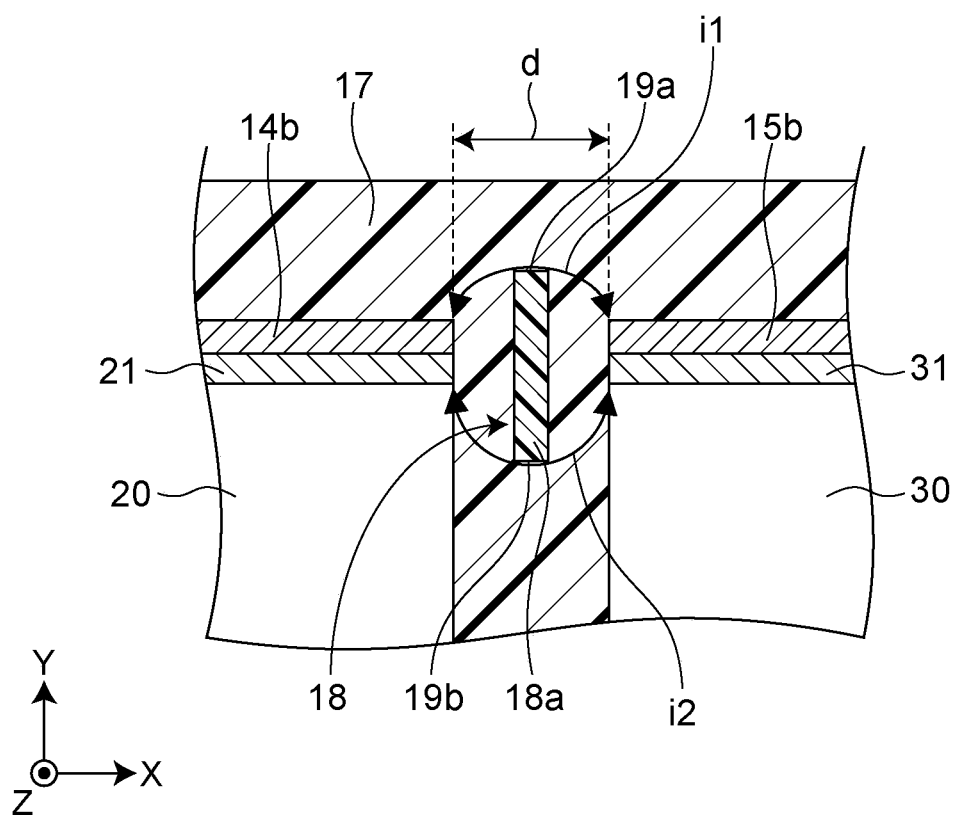
FIG. 8 is an enlarged view of a part of FIG. 7.
Figure 9:
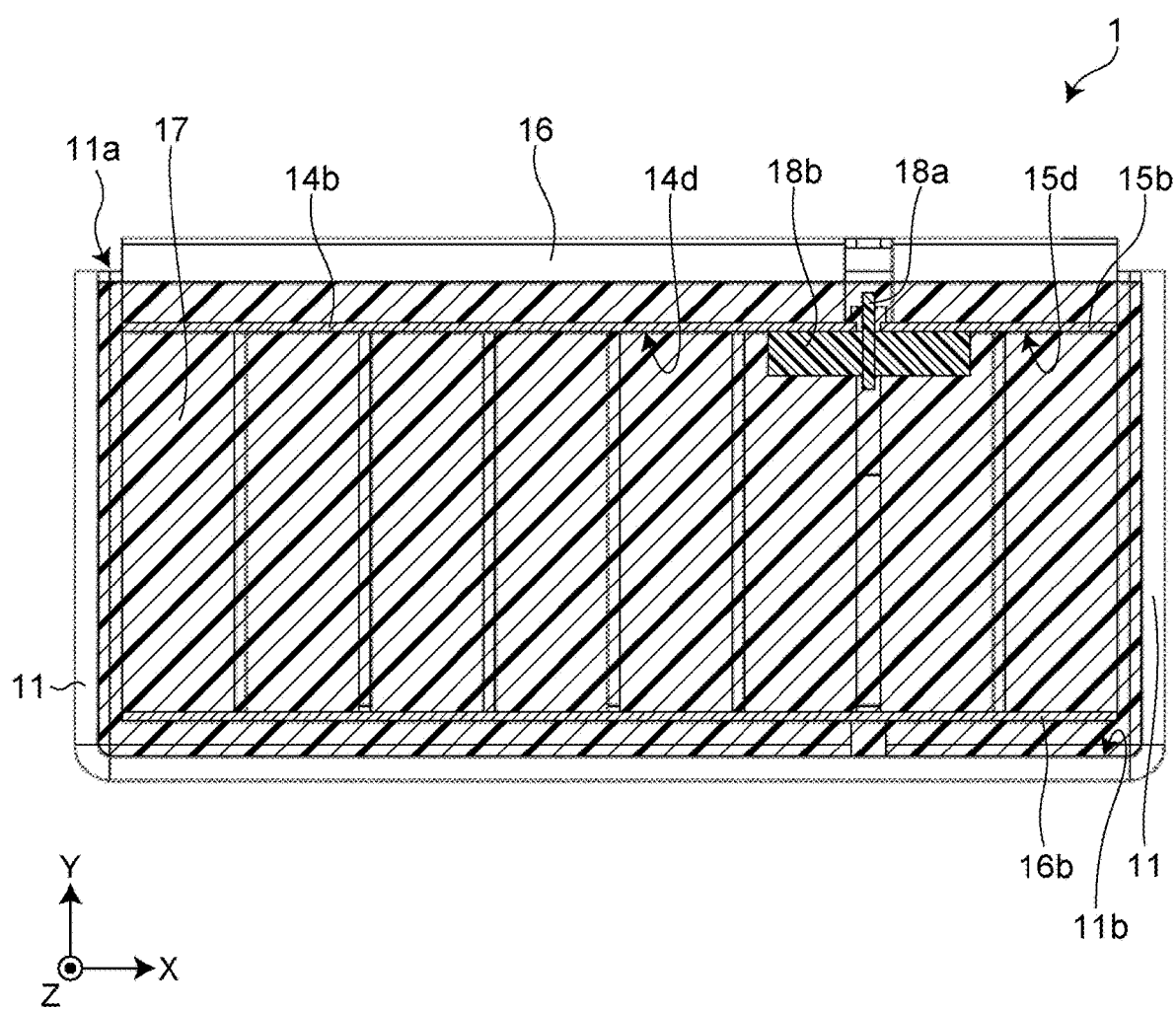
FIG. 9 is a cross-sectional view taken along line B-B of FIG. 2.
Figure 10:
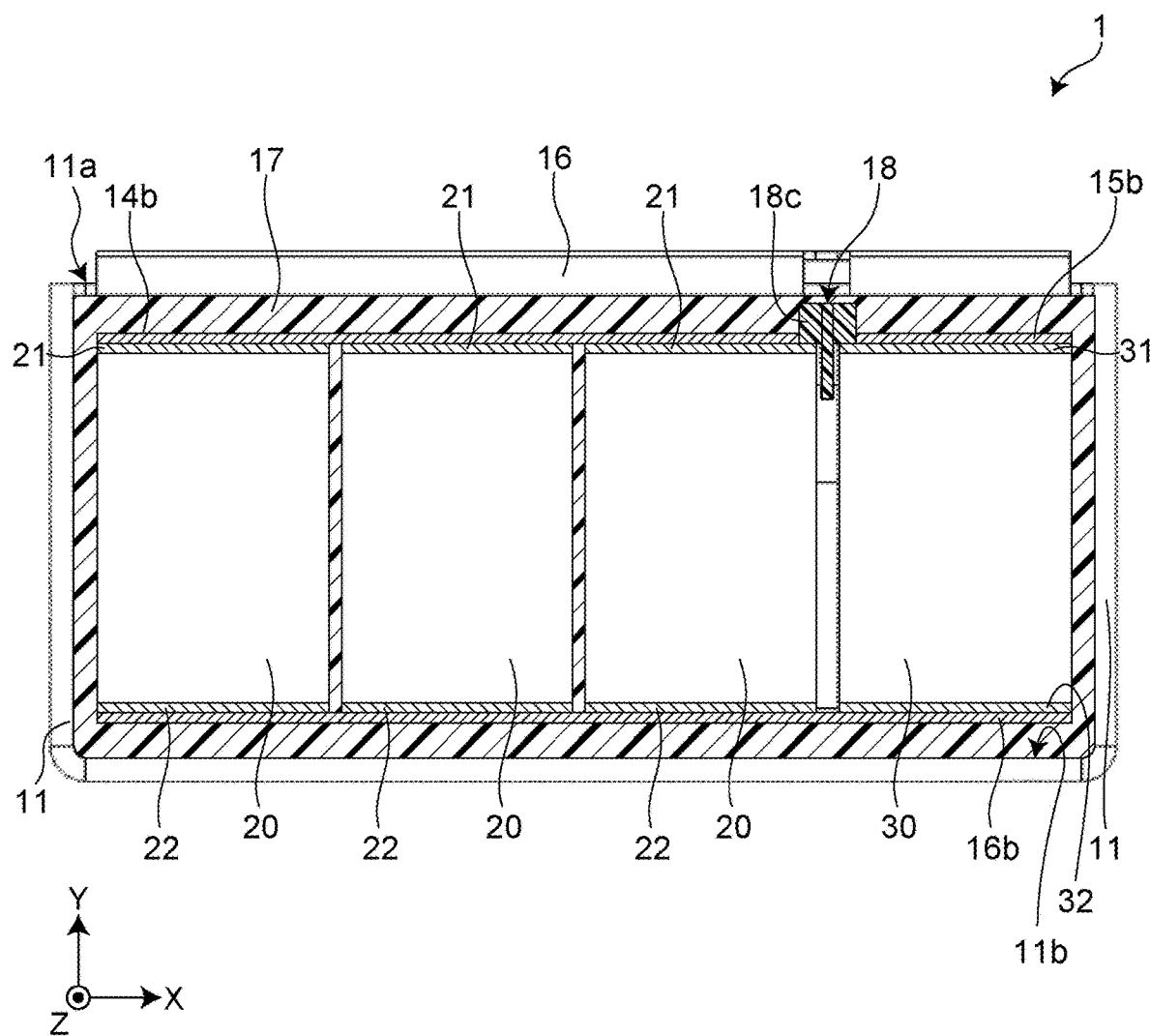
FIG. 10 is a cross-sectional view taken along line C-C of FIG. 2.
Figure 11A:
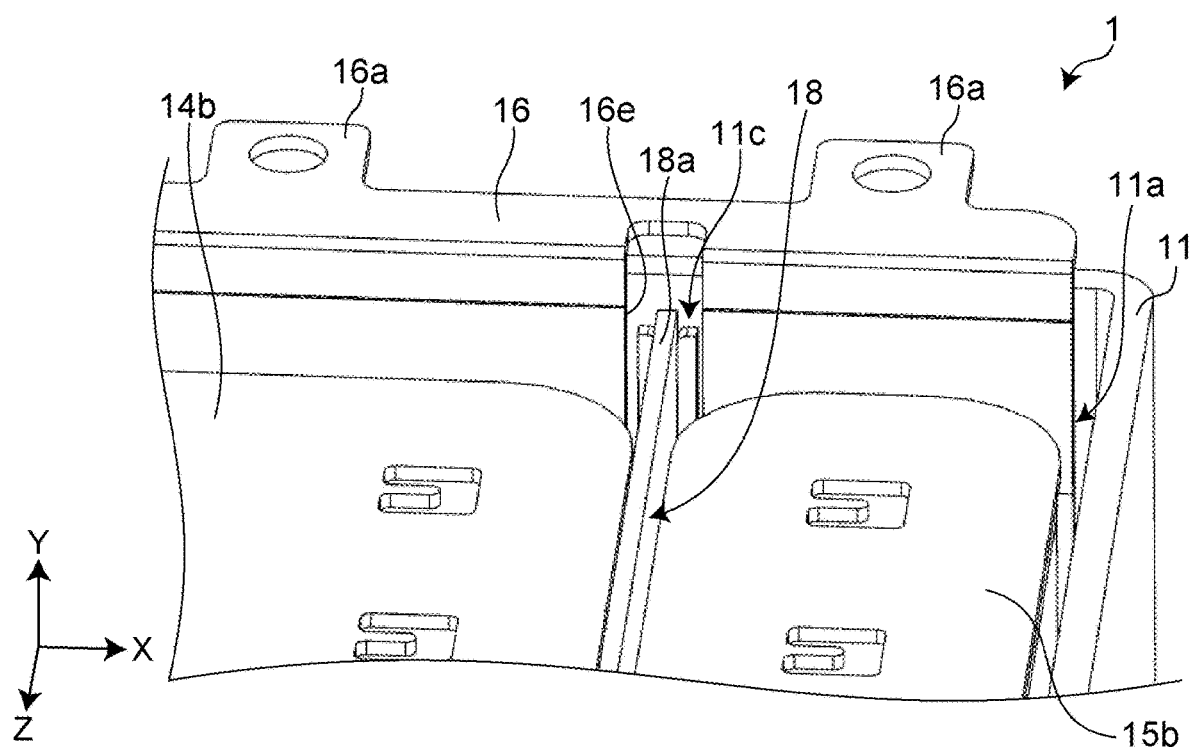
FIG. 11A is an enlarged perspective view of a part of the capacitor module of FIG. 1.
Figure 11B:
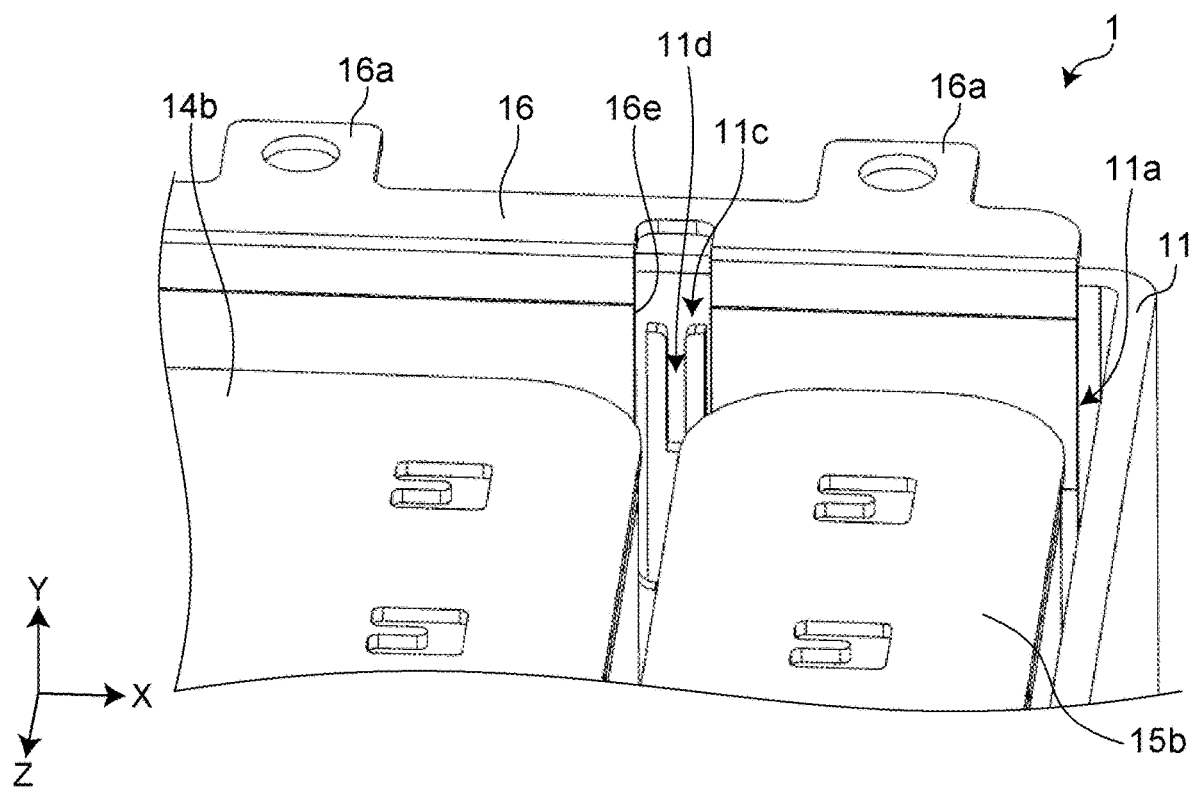
FIG. 11B is a perspective view of the capacitor module of FIG. 11A with the insulating member omitted.

FIG. 1 is a perspective view schematically illustrating a capacitor module 1 according to exemplary aspects of the present disclosure. FIG. 2 is a plan view of the capacitor module 1 of FIG. 1. FIG. 3A is a perspective view illustrating a first capacitor 20 included in a first capacitor group 12 of the capacitor module 1 of FIG. 1. FIG. 3B is a perspective view illustrating a second capacitor 30 included in a second capacitor group 13 of the capacitor module 1 of FIG. 1. FIG. 4 is a perspective view illustrating a first bus bar 14 and a second bus bar 15 included in the capacitor module 1 of FIG. 1. FIG. 5 is a perspective view illustrating a third bus bar 16 included in the capacitor module 1 of FIG. 1. FIG. 6 is a perspective view illustrating an insulating member 18 included in the capacitor module 1 of FIG. 1. FIG. 7 is a cross-sectional view of the capacitor module 1 of FIG. 2 taken along line A-A. FIG. 8 is an enlarged view of a part of FIG. 7. FIG. 9 is a cross-sectional view of the capacitor module 1 of FIG. 2 taken along line B-B. FIG. 10 is a cross-sectional view of the capacitor module 1 of FIG. 2 taken along line C-C. FIG. 11A is an enlarged perspective view of a part of the capacitor module 1 of FIG. 1. FIG. 11B is a perspective view of the capacitor module 1 of FIG. 11A with the insulating member 18 omitted. Note that X, Y, and Z directions in the drawing respectively indicate a lateral direction, a height direction, and a longitudinal direction of the capacitor module 1.

[Overall configuration] As illustrated in FIGS. 1 and 2, the capacitor module 1 includes a case 11, the first capacitor group 12, the second capacitor group 13, the first bus bar 14, the second bus bar 15, the third bus bar 16, a sealing resin 17, and the insulating member 18. In FIG. 2, the sealing resin 17 is not illustrated.

The case 11 has an opening 11a (see FIG. 1) provided at a position opposing a bottom surface 11b (see FIG. 7). The case 11 houses the first capacitor group 12, the second capacitor group 13, the first bus bar 14, the second bus bar 15, the third bus bar 16, and the insulating member 18, and the case 11 is filled with the sealing resin 17.

In the capacitor module 1, each of the first bus bar 14, the second bus bar 15, and the third bus bar 16 is provided to extend to the outside along the side surface of the case 11. The first bus bar 14, the second bus bar 15, and the third bus bar 16 respectively have terminals 14a, 15a, and 16a that connect an external element and circuit.

The first capacitor group 12 is an aggregate of capacitors including a plurality of the first capacitors 20 illustrated in FIG. 3A. The second capacitor group 13 is an aggregate of capacitors including one or a plurality of the second capacitors 30 illustrated in FIG. 3B. The first capacitor group 12 and the second capacitor group 13 have different functions (for example, capacitance), and therefore the capacitor module 1 has two functions. In an aspect of the disclosure, as illustrated in FIG. 2, the first capacitor group 12 includes six first capacitors 20, and the second capacitor group 13 includes two second capacitors 30.

Each of the first capacitor 20 and the second capacitor 30 is a wound type film capacitor. As illustrated in FIG. 3A, the first capacitor 20 has a first electrode 21, a second electrode 22, and a side surface 23 connecting the first electrode 21 and the second electrode 22. As illustrated in FIG. 3B, the second capacitor 30 has a third electrode 31, a fourth electrode 32, and a side surface 33 connecting the third electrode 31 and the fourth electrode 32.

Returning to FIG. 1, the first bus bar 14 and the second bus bar 15 are disposed on the opening side of the case 11. The opening side of the case 11 indicates a side close to the opening 11a relative to the bottom surface 11b in the case 11. The first bus bar 14 is connected to the first electrode 21 of each of the first capacitors 20. The second bus bar 15 is connected to the third electrode 31 of each of the second capacitors 30.

The third bus bar 16 having a plate shape is disposed on the bottom surface side of the case 11. The bottom surface side of the case 11 indicates a side close to the bottom surface 11b relative to the opening 11a in the case 11. Each of the first capacitors 20 and second capacitors 30 are disposed on the third bus bar 16. The second electrode 22 of each of the first capacitors 20 and the fourth electrode 32 of each of the second capacitors 30 are connected to the third bus bar 16. That is, each of the first capacitors 20 is disposed such that the first electrode 21 faces the opening side and the second electrode 22 faces the bottom surface side. Similarly, each of the second capacitors 30 is disposed such that the third electrode 31 faces the opening side and the fourth electrode 32 faces the bottom surface side.

As further shown, the insulating member 18 is disposed between the first bus bar 14 and the second bus bar 15. The insulating member 18 insulates the first electrode 21 of the first capacitor 20 and the first bus bar 14 from the third electrode 31 of the second capacitor 30 and the second bus bar 15.

Each component of the capacitor module 1 will be described below in detail.

Since the first capacitor 20 and the second capacitor 30 have the same configuration, only the first capacitor 20 will be described here. In an exemplary aspect, the first capacitor 20 is a wound type film capacitor. The first capacitor 20 is formed by winding a dielectric film having a metal evaporated film formed on the surface and pressing the wound body of the dielectric film into a flat shape. Therefore, as illustrated in FIG. 3A, the side surface 23 of the first capacitor 20 has a pair of flat portions 24 opposing each other and a pair of curved portions 25 connecting the pair of flat portions 24.

As the dielectric film of the first capacitor 20, for example, a plastic film such as polyethylene terephthalate, polypropylene, polyphenylene sulfide, or polyethylene naphthalate can be used. As the metal evaporated film formed on the surface of the plastic film, Al, Zn, or the like can be used. The first electrode 21 and the second electrode 22 are formed by spraying Zn or the like, for example, onto the end portion of the wound dielectric film.

The first bus bar 14 is a conductive member connected to the first electrode 21 of each of the first capacitors 20 of the first capacitor group 12. As illustrated in FIG. 4, the first bus bar 14 has the terminal 14a connected to an element, a circuit, or the like outside the capacitor module 1, and an electrode contact portion 14b in contact with each of the first electrodes 21.

The terminal 14a and the electrode contact portion 14b are formed (e.g., integrally) by bending one metal plate. The first bus bar 14 is formed of a conductive metal such as Al, Cu, or brass. The electrode contact portion 14b is formed with a hole 14c for connecting each of the first electrodes 21 by solder. The terminal 14a is formed by extending in the height direction (Y direction) from the electrode contact portion 14b and being bent in the longitudinal direction (Z direction) near the opening 11a of the case 11.

The second bus bar 15 is a conductive member connected to the third electrode 31 of each of the second capacitors 30 of the second capacitor group 13. As illustrated in FIG. 4, the second bus bar 15 has the terminal 15a connected to an element, a circuit, or the like outside the capacitor module 1, and an electrode contact portion 15b in contact with each of the third electrodes 31.

The terminal 15a and the electrode contact portion 15b are formed (e.g., integrally) by bending one metal plate. The second bus bar 15 is formed of a conductive metal such as Al, Cu, or brass. The electrode contact portion 15b is provided with a hole 15c for connecting each of the third electrodes 31 by solder. The terminal 15a is formed by extending in the height direction (Y direction) from the electrode contact portion 15b and being bent in the longitudinal direction (Z direction) near the opening 11a of the case 11.

The first bus bar 14 and the second bus bar 15 are arranged at an interval d in the lateral direction (X direction) in order to be electrically insulated as illustrated in FIG. 8 described later.

The third bus bar 16 is connected to the second electrode 22 of each of the first capacitors 20 of the first capacitor group 12 and the fourth electrode 32 of each of the second capacitors 30 of the second capacitor group 13. As illustrated in FIG. 5, the third bus bar 16 has a terminal 16a, an electrode contact portion 16b, and an extending portion 16c. The terminal 16a is connected to an element or a circuit outside the capacitor module 1. The electrode contact portion 16b is commonly in contact with the second electrode 22 and the fourth electrode 32. The extending portion 16c extends outward from the electrode contact portion 16b along the side surface of the case 11.

The terminal 16a, the electrode contact portion 16b, and the extending portion 16c are formed (e.g., integrally) by bending one metal. The third bus bar 16 is formed of a conductive metal such as Al, Cu, or brass. The electrode contact portion 16b is provided with a hole 16d for connecting each of the second electrodes 22 and fourth electrodes 32 by solder. The extending portion 16c extends in the height direction (Y direction) from the electrode contact portion 16b, and is bent in the longitudinal direction (Z direction) near the opening 11a of the case 11.

As illustrated in FIG. 5, the extending portion 16c of the third bus bar is provided with a through hole 16e. The through hole 16e is for inserting the insulating member 18 in the −Y direction.

As illustrated in FIGS. 1 and 2, the insulating member 18 is a member that insulates between the first bus bar 14 and the first electrode 21 and the second bus bar 15 and the third electrode 31. By disposing the insulating member 18, the first bus bar 14 and the first electrode 21 and the second bus bar 15 and the third electrode 31 can be more reliably insulated.

As illustrated in FIG. 6, the insulating member 18 has a first portion 18a having a plate shape and a second portion 18b extending so as to intersect along the first portion 18a. The insulating member 18 is formed of an electrically insulating resin such as polyphenylene sulfide (PPS resin) or polybutylene terephthalate (PBT resin). The insulating member 18 is formed by injection molding, and therefore a resin suitable for injection molding is preferably used.

As illustrated in FIGS. 1 and 2, the first portion 18a of the insulating member 18 is disposed along between the electrode contact portion 14b of the first bus bar 14 and the electrode contact portion 15b of the second bus bar 15. The first portion 18a has one end portion 19a positioned on the opening side relative to the electrode contact portion 14b of the first bus bar 14 and the electrode contact portion 15b of the second bus bar 15 in the direction from the opening 11a toward the bottom surface 11b, that is, in the height direction (Y direction) as illustrated in FIGS. 7 and 8. Another end portion 19b of the second portion 18b is positioned on the bottom surface side relative to the first electrode 21 and the third electrode 31.

By disposing the first portion 18a of the insulating member 18 in this manner, insulation distances i1 and i2 can be secured between the respective bus bars while reducing the distance between the first bus bar 14 and the second bus bar 15 as compared with the case of not disposing the insulating member 18. In one aspect of the disclosure, arrows i1 and i2 illustrated in FIG. 8 indicate the insulation distances i1 and i2 between the first bus bar 14 and the first electrode 21 and the second bus bar 15 and the third electrode 31.

In the case of not disposing the insulating member 18, the interval d between the first bus bar 14 and the second bus bar 15 becomes the insulation distance, and thus the interval d may need to be increased, which makes it difficult to downsize the capacitor module 1. In contrast, by disposing the insulating member 18 as in the present aspect, the insulation distance can be secured while reducing the interval d between the first bus bar 14 and the second bus bar 15. Therefore, the first bus bar 14 and the first electrode 21 and the second bus bar 15 and the third electrode 31 can be more reliably insulated from each other.

The insulation distances i1 and i2 are preferably set to appropriate values in consideration of the maximum applied voltages of the capacitor groups 12 and 13. It is possible to change the insulation distance by adjusting the positions in the height direction of the one end portion 19a and the other end portion 19b of the first portion 18a of the insulating member 18.

As illustrated in FIG. 9, the second portion 18b of the insulating member 18 is positioned on the bottom surface side of the case 11 with respect to a surface 14d on the first electrode 21 side of the electrode contact portion 14b of the first bus bar 14 and a surface 15d on the third electrode 31 side of the electrode contact portion 15b of the second bus bar 15. That is, the second portion 18b of the insulating member 18 is disposed on the lower side in the height direction of the first bus bar 14 and the second bus bar 15. Since the second portion 18b is disposed on the lower side of the first bus bar 14 and the second bus bar 15, it is possible to prevent the insulating member 18 from uplifting due to the buoyancy of the sealing resin 17.

Returning to FIG. 2, the second portion 18b of the insulating member 18 is disposed between the adjacent curved portions 25 of the adjacent first capacitors 20 and between the adjacent curved portions 35 of the adjacent second capacitors 30. Since the first capacitor 20 has a shape having the curved portion 25, a space is generated between the adjacent curved portions 25 of the adjacent first capacitors 20. Similarly, in the case of the second capacitor 30, a space is generated between the adjacent curved portions 35. When the second portion 18b of the insulating member 18 is disposed using this space, the second portion 18b of the insulating member 18 can be disposed without enlarging the case 11, and the uplift of the insulating member 18 can be prevented while effectively using the space.

In the present aspect, the first portion 18a of the insulating member 18 is provided with a third portion 18c that prevents positional displacement in a horizontal direction including the lateral direction (e.g., the X direction) and the longitudinal direction (e.g., the Z direction). In order to create a space for disposing the third portion 18c, the electrode contact portion 14b of the first bus bar 14 and the electrode contact portion 15b of the second bus bar 15 are provided with cutouts 14e and 15e, respectively. As illustrated in FIG. 10, the third portion 18c is disposed so as to be placed on a part of the first electrode 21 and a part of the third electrode 31. The third portion 18c of the insulating member 18 is disposed on the upper side in the height direction of the first capacitor 20 and the second capacitor 30 and is surrounded by the cutouts 14e and 15e, so that the insulating member 18 can be prevented from being displaced in the longitudinal direction (e.g., the Z direction) or the lateral direction (e.g., the Z direction).

As described above, in the insulating member 18, the movement in the +Y direction can be restricted by the second portion 18b, and the movement in the X direction and the Z direction can be restricted by the third portion 18c.

The case 11 houses each component of the capacitor module 1. In the present aspect, the case 11 has the opening 11a provided at a position opposing the bottom surface 11b. In the present aspect, the case 11 has the opening 11a and the bottom surface 11b that have a substantially square shape, and has a box shape. The shape of the case 11 is not limited to this, and can take various shapes depending on the arrangement of the capacitor group. The case 11 is formed of, for example, a synthetic resin such as polyphenylene sulfide (PPS resin) or polybutylene terephthalate (PBT resin).

As illustrated in FIGS. 11A and 11B, a protrusion 11c for positioning the insulating member 18 is provided in the case 11. The protrusion 11c is a protrusion provided inward from the inner side surface of the case 11, and provides a recess 11d that receives the first portion 18a of the insulating member 18 in a direction from the opening 11a toward the bottom surface 11b. The protrusion 11c restricts the movement of the insulating member 18 in the lateral direction (e.g., the X direction) and the longitudinal direction (e.g., the Z direction). That is, the insulating member 18 is positioned in the X direction and the Z direction by the protrusion 11c. The shape of the protrusion 11c is not limited to that illustrated in FIGS. 11A and 11B, and may only be required to be a shape as long as it can hold the end portion of the insulating member 18.

When the first portion 18a of the insulating member 18 is disposed on the protrusion 11c, the movement of the insulating member 18 in the X direction and the Z direction is restricted. Furthermore, the movement of the insulating member 18 in the −Y direction is also restricted. Since the periphery of the insulating member 18 is filled with the sealing resin 17, the insulating member 18 is positioned by the protrusion 11c of the case 11 and the sealing resin 17.

As illustrated in FIGS. 11A and 11B, when the third bus bar 16 is disposed in the case 11, the through hole 16e of the third bus bar 16 overlaps the protrusion 11c of the case 11.

By providing the through hole 16e of the third bus bar 16 and the protrusion 11c of the case 11 in such arrangement, it is possible to insert the insulating member 18 in the direction from the opening 11a toward the bottom surface 11b.

As illustrated in FIGS. 7, 9, and 10, the bottom surface 11b of the case 11 is flat. By making the bottom surface 11b of the case 11 flat, the sealing resin 17 easily spreads over approximately the entire the bottom surface 11b as compared with a case where the bottom surface 11b is provided with a convex, and therefore the filling property of the sealing resin 17 can be improved.

The sealing resin 17 is filled in the case 11 to seal each component of the capacitor module 1. The sealing resin 17 is a thermosetting resin, and for example, an epoxy resin can be used. Alternatively, it may be a urethane resin. As the material of the sealing resin 17, a material having high fluidity and adhesiveness is preferably used.

A manufacturing method of the capacitor module 1 will be described with reference to FIGS. 12A to 12F. FIGS. 12A to 12F are views illustrating the manufacturing process of the capacitor module 1 according to one exemplary aspect of the disclosure.

First, the third bus bar 16 is prepared. As illustrated in FIG. 5, the third bus bar 16 can be formed by pressing a metal plate, for example. In order to insulate between the third bus bar 16 and the first electrode 21 of each of the first capacitors 20 and the third electrode 31 of each of the second capacitors 30, an insulating paper 41 is attached to the extending portion 16c of the third bus bar 16.

Figure 12A:
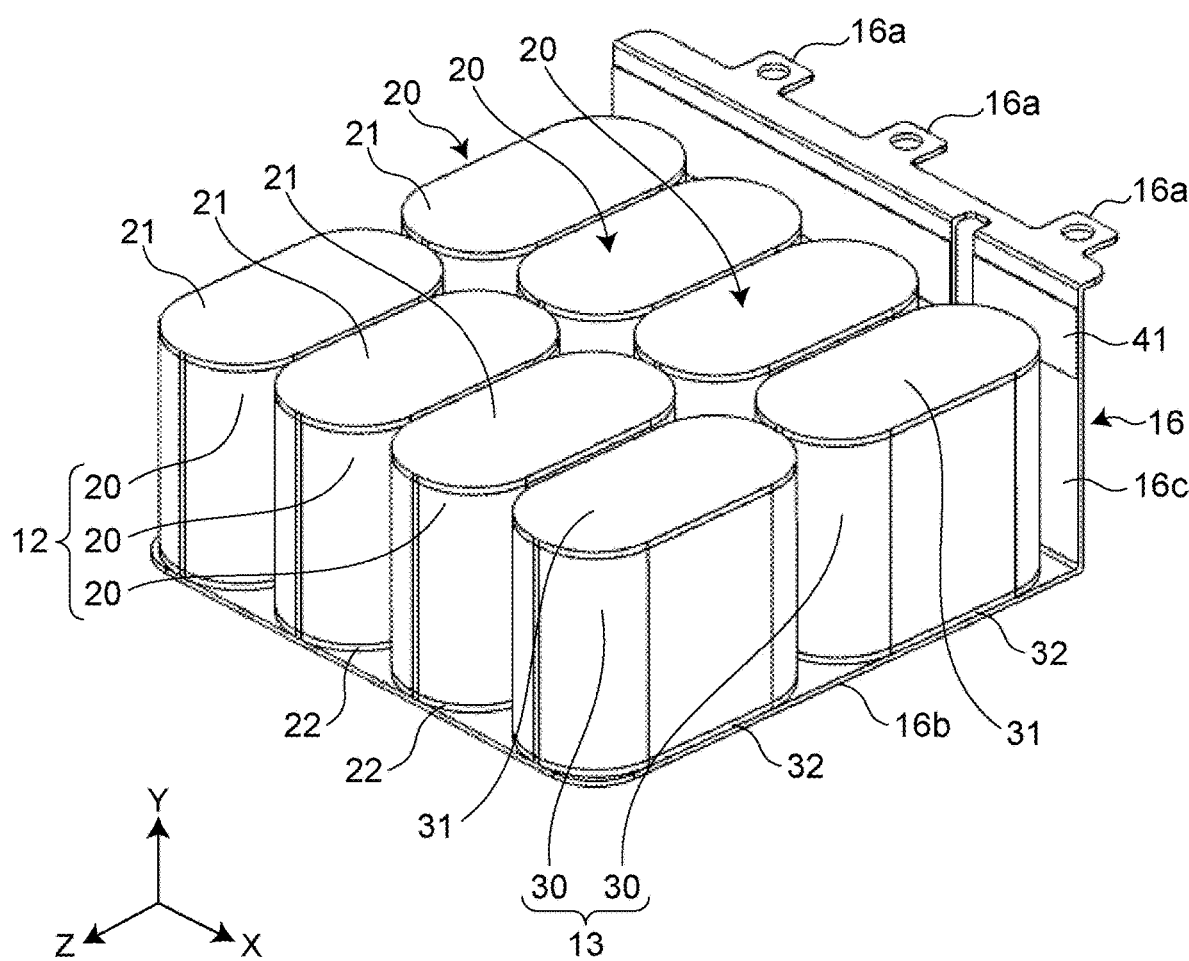
FIG. 12A is a view illustrating a manufacturing process of the capacitor module in accordance with aspects of the present disclosure.

Next, each of the first capacitors 20 and second capacitors 30 is disposed in the electrode contact portion 16b of the third bus bar 16. Specifically, as illustrated in FIG. 12A, each of the first capacitors 20 and second capacitors 30 is disposed such that the second electrode 22 and the fourth electrode 32 face the electrode contact portion 16b.

Figure 12B:
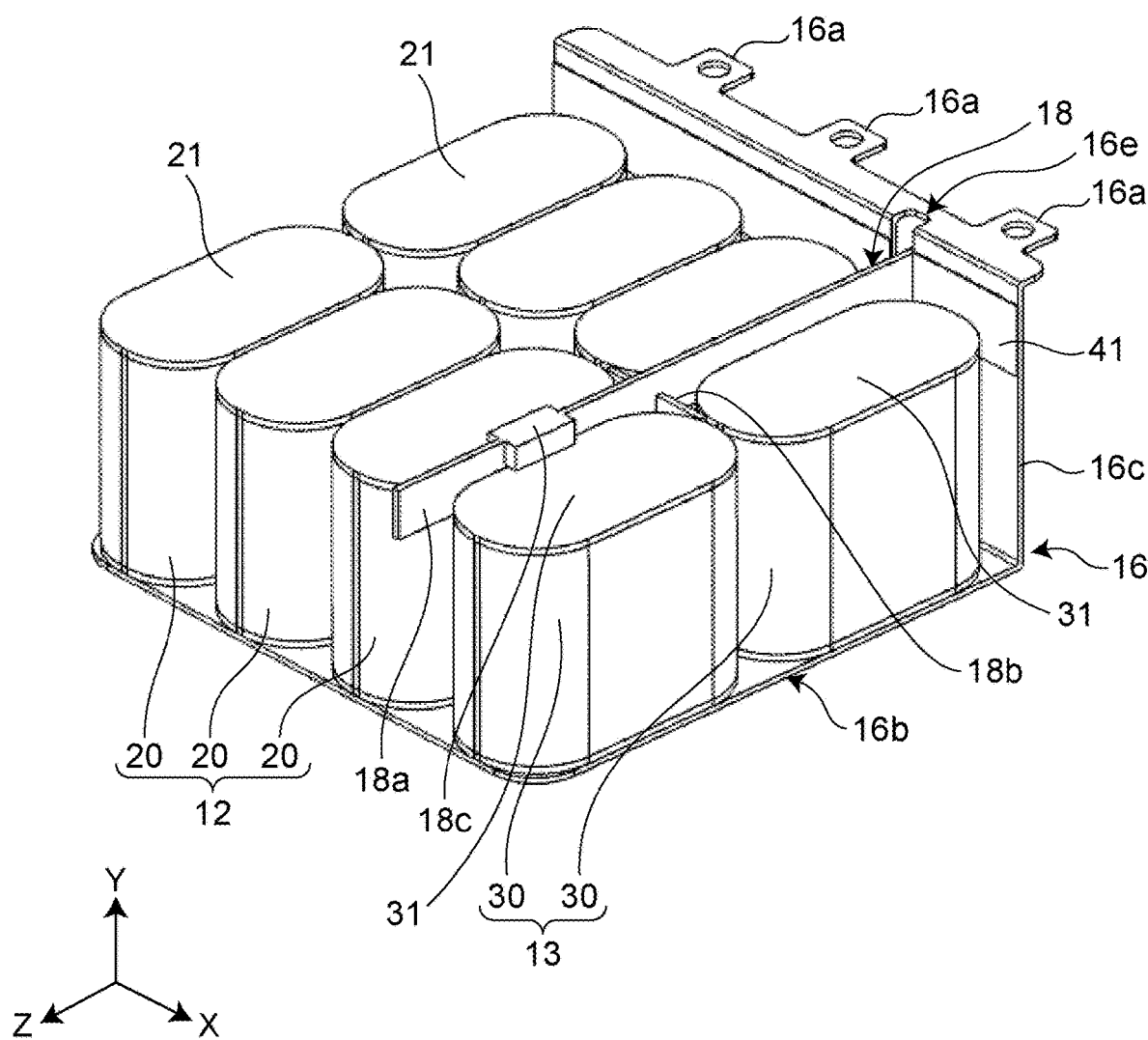
FIG. 12B is a view illustrating the manufacturing process of the capacitor module in accordance with aspects of the present disclosure.

Next, the insulating member 18 is disposed. Specifically, as illustrated in FIG. 12B, the first portion 18a of the insulating member 18 is disposed between the first capacitor group 12 and the second capacitor group 13. At this time, the second portion 18b is positioned between the curved portions 25 of the first capacitors 20 and between the curved portions 35 of the second capacitors 30. The third portion 18c is placed on the first capacitor 20 and the second capacitor 30. By disposing the insulating member 18 in this manner, the first portion 18a of the insulating member 18 is disposed so as to be held between the first capacitor group 12 and the second capacitor group 13, and the movement in the lateral direction is restricted. At this time, the end portion of the first portion 18a passes through the through hole 16e of the third bus bar, and therefore the first portion 18a and the third bus bar 16 do not interfere with each other.

In FIG. 12B, the insulating member 18 is not in a fixed state, and is disposed so that the end portion of the insulating member 18 can be fitted into the recess 11d in the process of inserting each component described later into the case 11. At this time, the insulating member 18 becomes in a state of being movable in the Y direction by the second portion 18b being positioned in the −Y direction relative to the first electrode 21 and the third electrode 31, and therefore it is possible to easily perform fitting to the recess 11d.

Figure 12C:
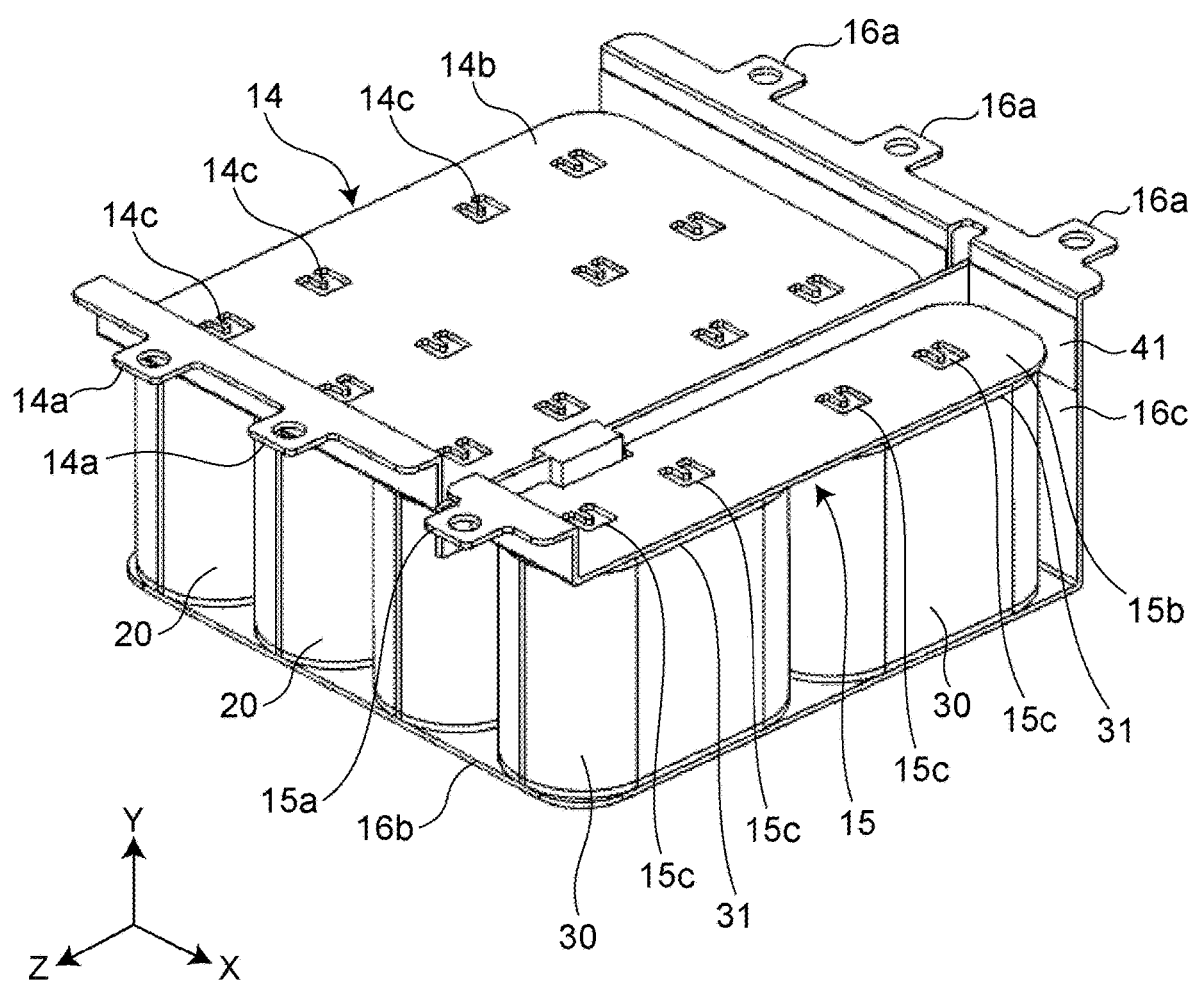
FIG. 12C is a view illustrating the manufacturing process of the capacitor module in accordance with aspects of the present disclosure.

Next, the first bus bar 14 and the second bus bar 15 are disposed. Specifically, as illustrated in FIG. 12C, the electrode contact portion 14b of the first bus bar 14 is placed on the first electrode 21 of each of the first capacitors 20 of the first capacitor group 12. The electrode contact portion 15b of the second bus bar 15 is placed on the third electrode 31 of each of the second capacitors 30 of the second capacitor group 13. At this time, the first bus bar 14 and the second bus bar 15 are disposed such that third portion 18c of the insulating member 18 is positioned in the cutouts 14e and 15e of the first bus bar 14 and the second bus bar 15, respectively.

Thereafter, in the hole 14c of the electrode contact portion 14b of the first bus bar 14, the electrode contact portion 14b and each of the first electrodes 21 are connected by solder (not illustrated). In the hole 15c of the electrode contact portion 15b of the second bus bar 15, the electrode contact portion 15b and each of the third electrodes 31 are connected by solder (not illustrated). By soldering, it is possible to electrically connect the first bus bar 14 and each of the first electrodes 21, and the second bus bar 15 and each of the third electrodes 31.

Figure 12D:
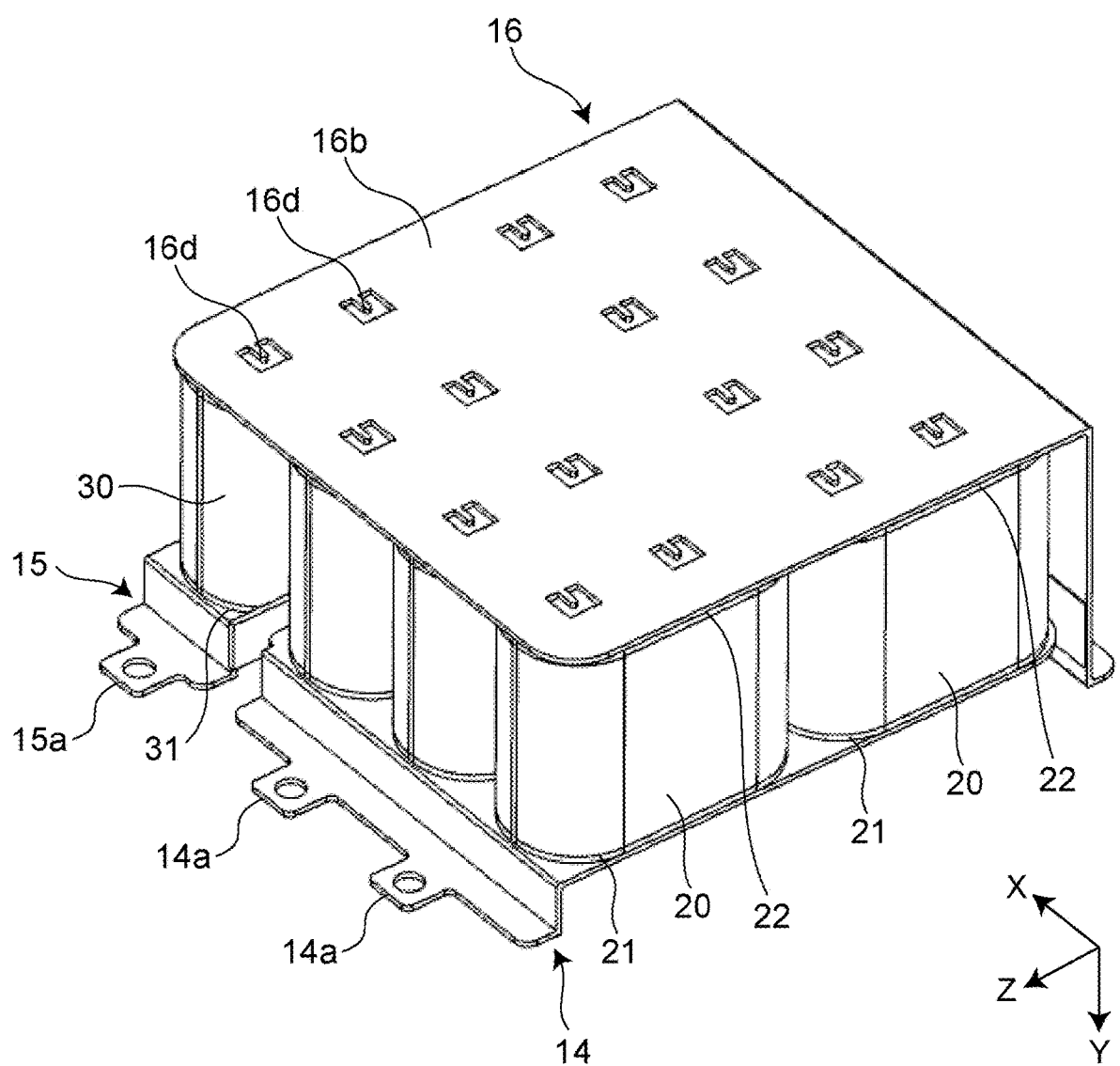
FIG. 12D is a view illustrating the manufacturing process of the capacitor module in accordance with aspects of the present disclosure.

Next, the third bus bar 16 is connected to each of the second electrodes 22 and fourth electrodes 32 by solder (not illustrated). Specifically, as illustrated in FIG. 12D, the third bus bar 16 is electrically connected to the second electrode 22 and the fourth electrode 32 by soldering in the hole 16d provided in the electrode contact portion 16b of the third bus bar 16.

Figure 12E:
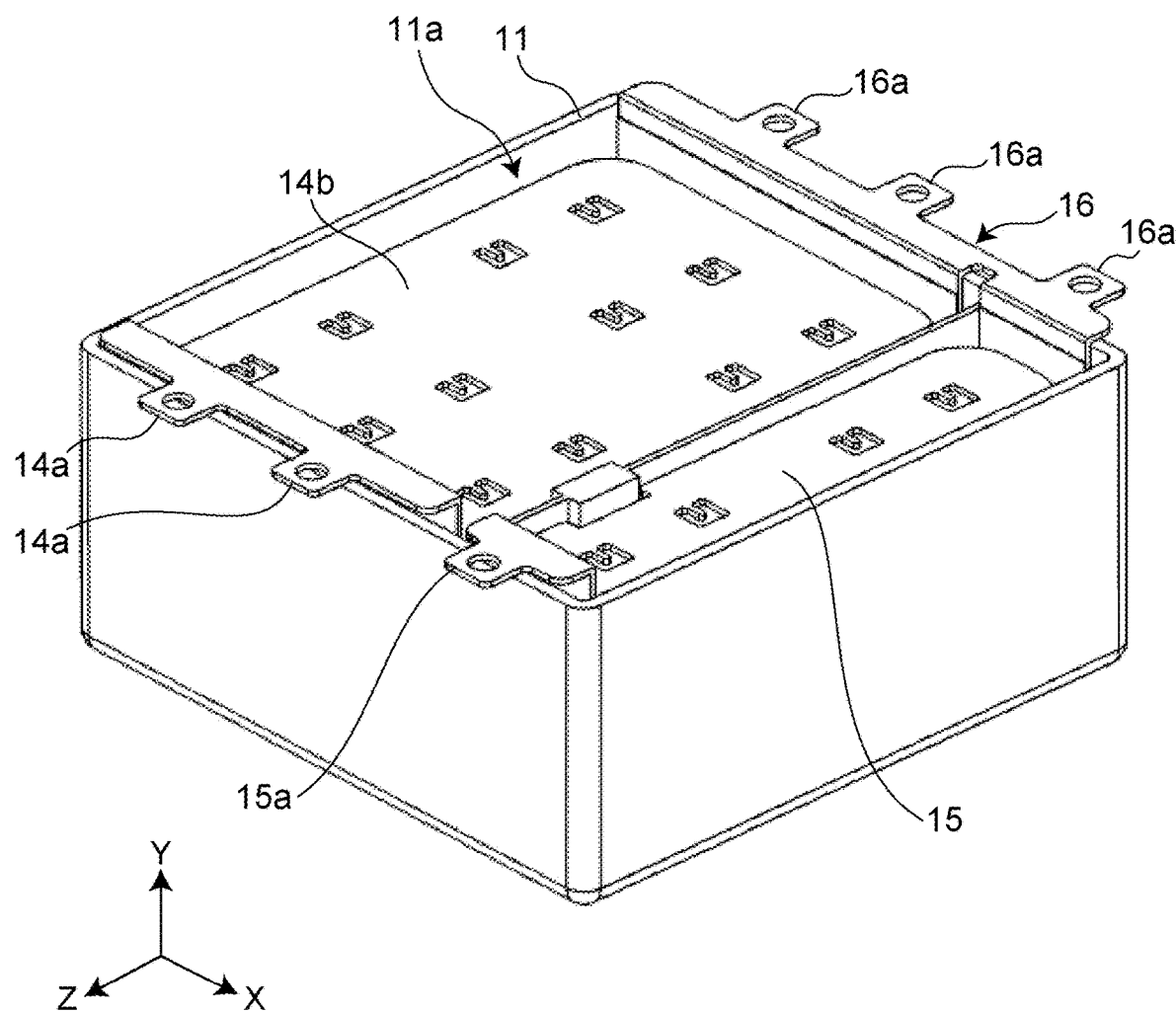
FIG. 12E is a view illustrating the manufacturing process of the capacitor module in accordance with aspects of the present disclosure.

Next, as illustrated in FIG. 12E, each of the first capacitors 20 and second capacitors 30, the first bus bar 14, the second bus bar 15, the third bus bar 16, and the insulating member 18 that have been soldered are inserted into the case 11. At this time, the end portion of the first portion 18a of the insulating member 18 is inserted into recess 11d of the protrusion 11c of the case 11 (see, e.g., FIG. 11A). When the end portion of the first portion 18a is inserted into the protrusion 11c, the insulating member 18 is positioned in the X direction and the Z direction inside the case 11.

Figure 12F:
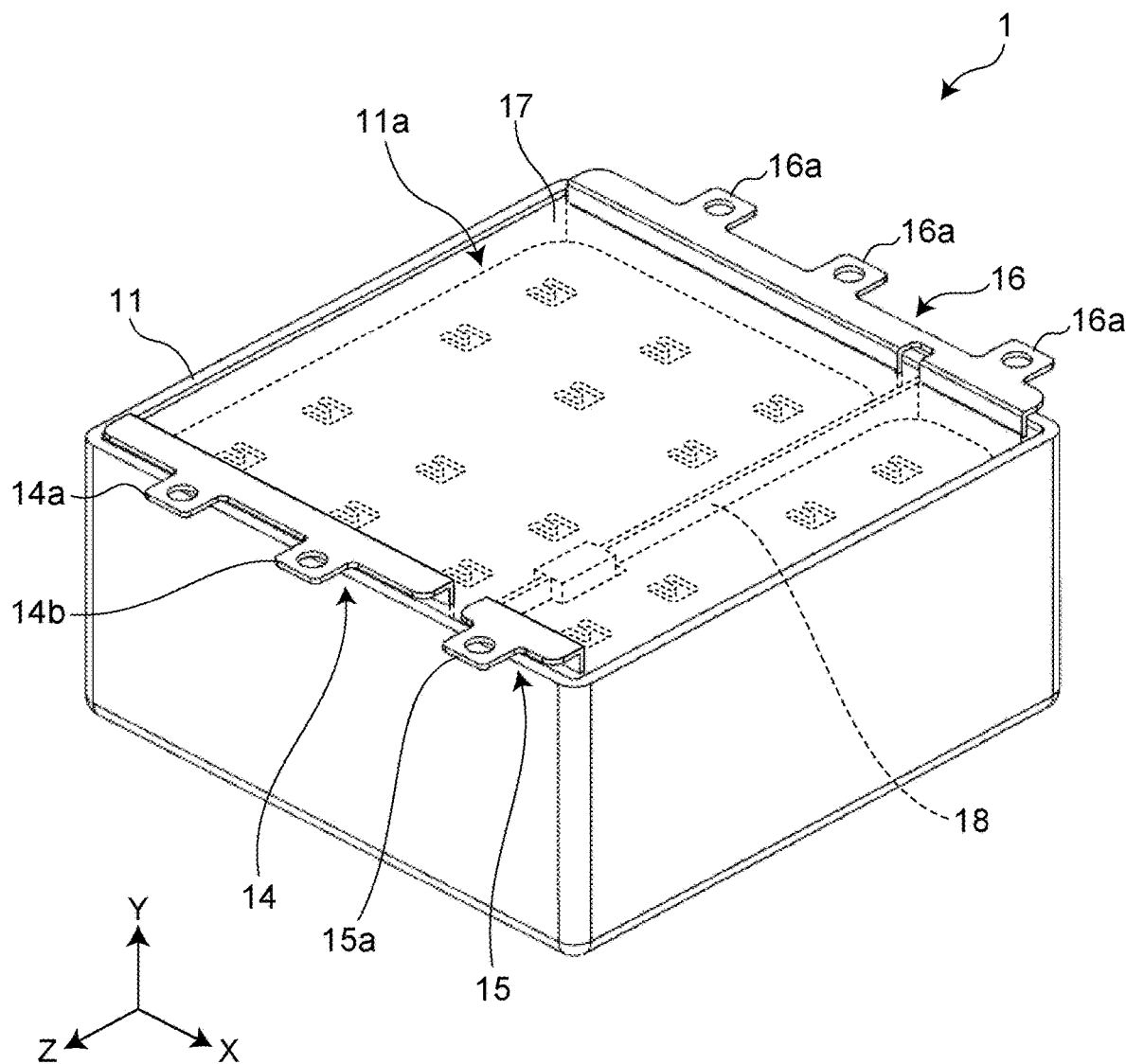
FIG. 12F is a view illustrating the manufacturing process of the capacitor module in accordance with aspects of the present disclosure.

After insertion into the case 11, as illustrated in FIG. 12F, the case 11 is filled with the sealing resin 17, and the sealing resin 17 is cured to complete the capacitor module 1. At this time, the movement of the second portion 18b of the insulating member 18 in the +Y direction is restricted by the first bus bar 14 and the second bus bar 15 (see, e.g., FIG. 9). Therefore, it is possible to prevent uplift of the insulating member 18 when the sealing resin 17 is filled. Since the bottom surface 11b of the case 11 is formed flat, the filling property of the sealing resin 17 is improved.

According to the capacitor module 1 according to one aspect of the disclosure, it is possible to achieve the following effects.

The capacitor module 1 includes the case 11, the first capacitor group 12, the second capacitor group 13, the first bus bar 14, the second bus bar 15, the third bus bar 16, the sealing resin 17, and the insulating member 18. The case 11 has the opening 11a provided at a position opposing the bottom surface 1ib. The first capacitor group 12 includes one or a plurality of the first capacitors 20. The first capacitor 20 is disposed inside the case 11 and has the first electrode 21, the second electrode 22, and the side surface 23 connecting the first electrode 21 and the second electrode 22. The second capacitor group 13 includes one or a plurality of the second capacitors 30. The second capacitor 30 is disposed inside the case 11, and includes the third electrode 31, the fourth electrode 32, and the side surface 33 connecting third electrode 31 and the fourth electrode 32. The first bus bar 14 is disposed on the opening 11a side with respect to the first capacitor group 12 inside the case 11, and has a plate shape having the electrode contact portion 14b in contact with the first electrode 21. The second bus bar 15 is disposed on the opening 11a side with respect to the second capacitor group 13 inside the case 11, and has a plate shape having the electrode contact portion 15b in contact with the third electrode 31. The third bus bar 16 is disposed on the bottom surface 11b side with respect to the first capacitor group 12 and the second capacitor group 13 inside the case 11, and has the electrode contact portion 16b commonly in contact with the second electrode 22 and the fourth electrode 32. The sealing resin 17 is filled in the case 11. The insulating member 18 is provided between the electrode contact portion 14b of the first bus bar 14 and the electrode contact portion 15b of the second bus bar 15, and is surrounded by the sealing resin 17.

With such configuration, by providing the insulating member 18, insulation between the first bus bar 14 and the first electrode 21 and the second bus bar 15 and the third electrode 31 can be improved as compared with a case where the insulating member 18 is not disposed and only the sealing resin 17 is provided. When the insulating member 18 is not disposed, insulation is provided by the sealing resin 17, but there is a risk of insulation failure due to bubbles generated in the sealing resin 17. By providing the insulating member 18 separately from the sealing resin 17, it is possible to reliably insulate between the first bus bar 14 and the first electrode 21 and the second bus bar 15 and the third electrode 31, and the insulation is improved.

By disposing the insulating member 18, it is possible to secure the long insulation distances i1 and i2 while reducing the distance d between the first bus bar 14 and the first electrode 21 and the second bus bar 15 and the third electrode 31. Therefore, the interval d between the first bus bar 14 and the first electrode 21 and the second bus bar 15 and the third electrode 31 can be reduced, thereby contributing to downsizing of the capacitor module 1.

The one end portion 19a of the insulating member 18 is positioned on the opening side of the case 11 relative to the electrode contact portion 14b of the first bus bar 14 and the electrode contact portion 15b of the second bus bar 15 in the direction from the opening 11a toward the bottom surface 11b. The other end portion 19b of the insulating member 18 is positioned on the bottom surface side of the case 11 relative to the first electrode 21 and the third electrode 31. Such configuration makes it possible to secure an appropriate insulation distance.

The insulation distance between the first bus bar 14 and the second bus bar 15 can be changed by the positions in the height direction (e.g., Y direction) of the end portions 19a and 19b of the insulating member 18. Referring to FIG. 8, if the position in the height direction of the one end portion 19a is positioned upper (e.g., +Y direction) than that in FIG. 8, the insulation distance i1 becomes longer. Similarly, if the position in the height direction of the other end portion 19b of the insulating member 18 is positioned lower (e.g., -Y direction) than that in FIG. 8, the insulation distance i2 becomes longer. Thus, the lengths of the insulation distances i1 and i2 are preferably set appropriately according to the capacitance of the capacitor module 1 or the like.

On the other hand, when the position in the height direction of the one end portion 19a of the insulating member 18 is positioned lower (e.g., -Y direction) than the first bus bar 14 and the second bus bar 15, the insulation distance is the distanced between the electrode contact portion 14b and the electrode contact portion 15b. In this case, in order to secure an appropriate insulation distance, the distance d is increased, which makes it difficult to downsize the capacitor module 1. Similarly, when the position in the height direction of the other end portion 19b of the insulating member 18 is upper (e.g., +Y direction) than the first electrode 21 and the third electrode 31, the insulation distance is the distance d between the first electrode 21 and the third electrode 31. Also in this case, in order to secure an appropriate insulation distance, the distance d is increased. By disposing the insulating member 18 as in one aspect of the disclosure, it is possible to reduce the distance d while securing the insulation, thereby contributing to downsizing of the capacitor module 1.

The inner side surface of the case 11 has the recess 11d that receives the insulating member 18 in the direction from the opening 11a toward the bottom surface 11b, and is provided with the protrusion 11c that positions the insulating member 18. Such configuration prevents positional displacement of the insulating member 18 in the case 11, and provide insulation more reliably.

The third bus bar 16 further has the extending portion 16c extending to the outside of the case 11 through the opening 11a along the side surface of the case 11 from the electrode contact portion 16b of the third bus bar 16. The extending portion 16c is provided with the through hole 16e through which the insulating member 18 passes. Such configuration prevents interference between the third bus bar 16 and the insulating member 18.

The insulating member 18 includes the first portion 18a and the second portion 18b. The first portion 18a extends along between the electrode contact portion 14b of the first bus bar 14 and the electrode contact portion 15b of the second bus bar 15. The second portion 18b extends so as to intersect the first portion 18a, and extends so as to be positioned on the bottom surface side of the case 11 with respect to the surface 14d on the first electrode 21 side of the electrode contact portion 14b of the first bus bar 14 and the surface 15d on the third electrode 31 side of the electrode contact portion 15b of the second bus bar 15. Such configuration prevents uplift due to buoyancy of the sealing resin 17 of the insulating member 18.

The side surface 23 of the first capacitor 20 has a pair of flat portions 24 opposing each other and a pair of curved portions 25 connecting the pair of flat portions 24. The side surface 33 of the second capacitor 30 includes a pair of flat portions 34 and a pair of the curved portions 35 connecting the pair of flat portions 34. The second portion 18b of the insulating member 18 is disposed between the adjacent curved portions 25 of the adjacent first capacitors 20 and between the adjacent curved portions 35 of the adjacent second capacitors 30. Such configuration makes it possible to dispose the second portion 18b in a space provided between the adjacent curved portions 25 and between the adjacent curved portions 35, thereby contributing to downsizing of the capacitor module 1.

The bottom surface 11b of the case 11 is flat. Such configuration improves the filling property of the sealing resin 17. When the bottom surface 11b of the case 11 is flat, the fluidity of the resin is improved, and therefore it is possible to prevent the manufacturing cost from increasing due to time taken for filling of the resin due to blocking of the flow of the resin when filling the case with the resin. When the bottom surface 11b of the case 11 is flat, manufacturing of the case 11 becomes easy, and therefore downsizing can be achieved, which contributes to downsizing of the capacitor module 1.

In one exemplary aspect of the disclosure, an example in which the first capacitor group 12 includes the six first capacitors 20 and the second capacitor group 13 includes the two second capacitors 30 has been described, but the present disclosure is not limited to this. The numbers of capacitors included in the first capacitor group 12 and the second capacitor group 13 may be one or more.

In one exemplary aspect of the disclosure, an example in which the second portion 18b of the insulating member 18 extends to both the first capacitor group 12 side and the second capacitor group 13 side has been described, but the present disclosure is not limited to this. The second portion 18b may extend to either the first capacitor group 12 side or the second capacitor group 13 side. Two or more second portions 18b may be provided in additional exemplary aspects.

In one exemplary aspect of the disclosure, an example in which the insulating member 18 is provided with the second portion 18b and the third portion 18c has been described, but the second portion 18b and the third portion 18c need not be provided. When the insulating member 18 is not provided with the third portion 18c, the respective cutouts 14e and 15e of the first bus bar 14 and the second bus bar 15 need not be provided.

Figure 13A:
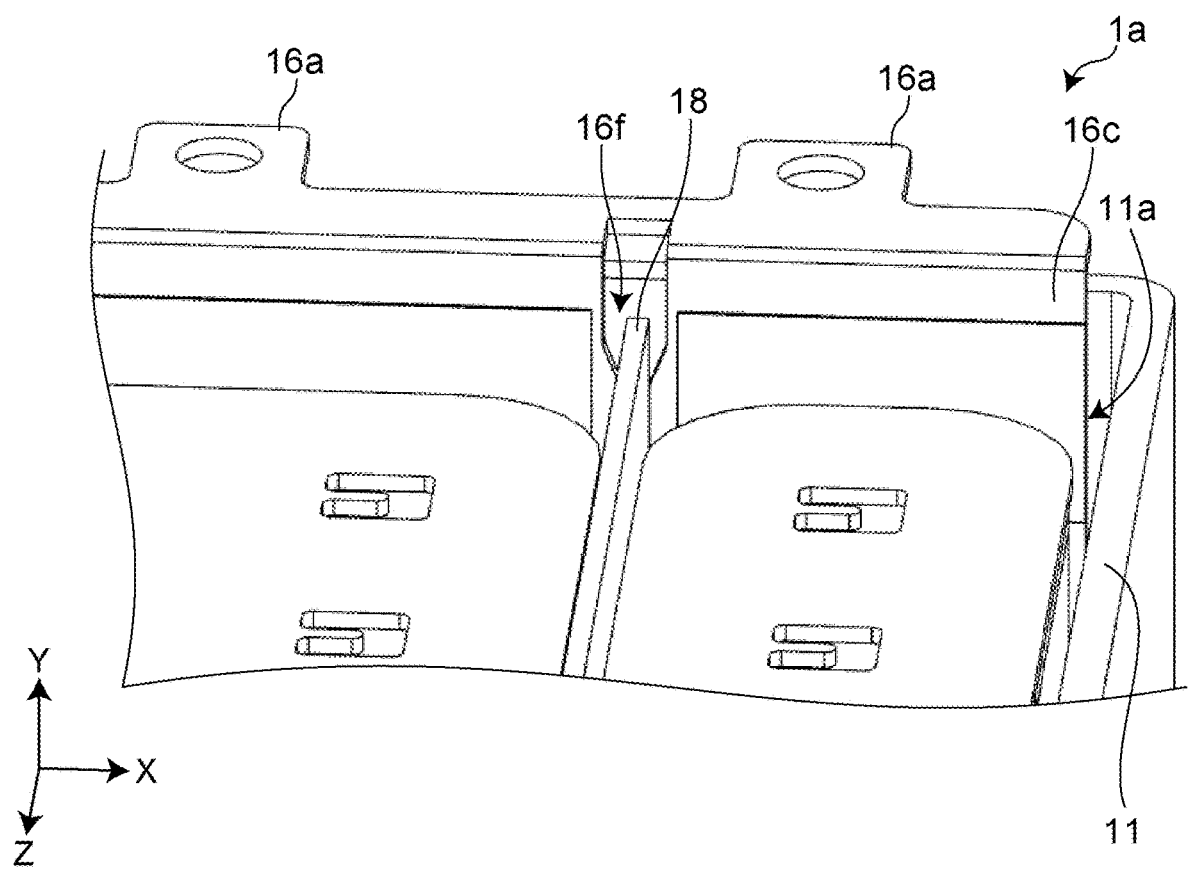
FIG. 13A is an enlarged perspective view of a part of the capacitor module according to a modification of an aspect of the present disclosure.
Figure 13B:
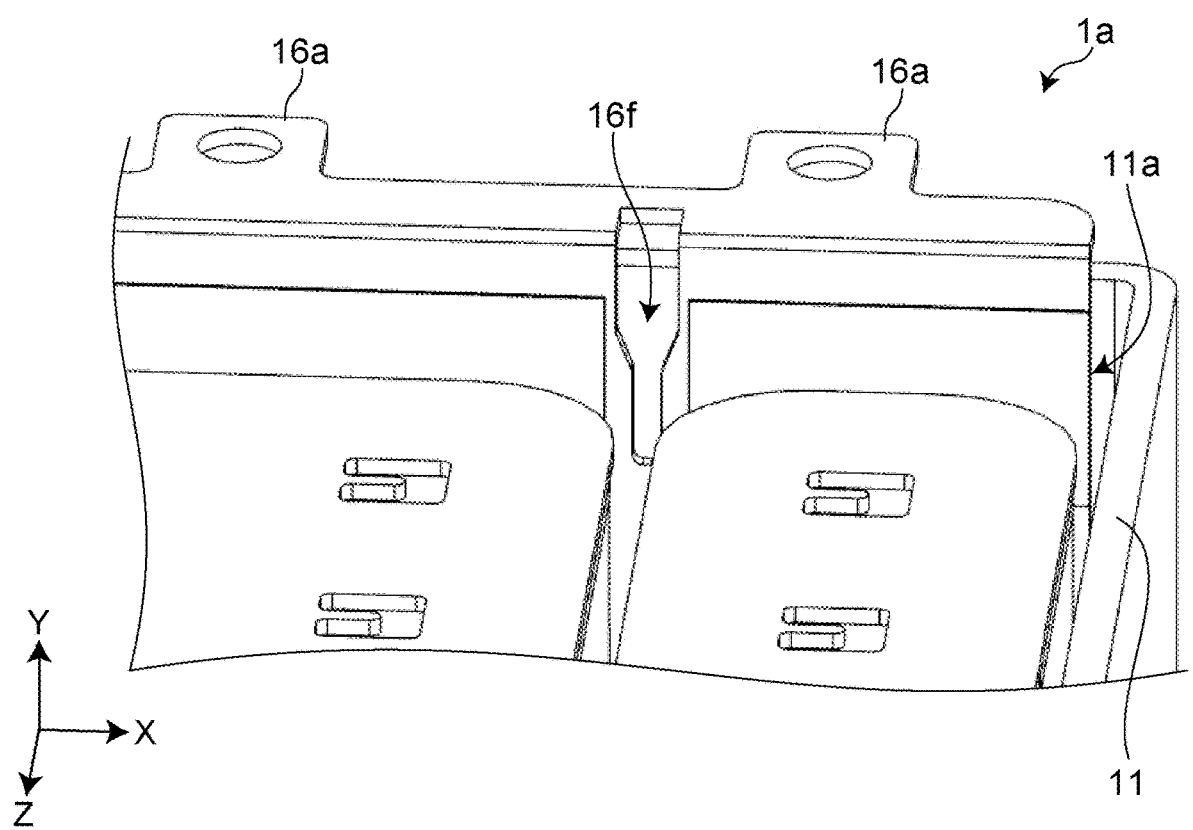
FIG. 13B is a perspective view of the capacitor module of FIG. 13A with the insulating member omitted.

While in one exemplary aspect of the disclosure, the insulating member 18 is positioned by the protrusion 11c of the case 11, the present disclosure is not limited to such a case, and the insulating member 18 may be positioned in the through hole of the third bus bar 16 as illustrated in FIGS. 13A and 13B. FIG. 13A is an enlarged perspective view of a part of a capacitor module 1a according to a modification of one aspect of the disclosure of the present disclosure. FIG. 13B is a perspective view of the capacitor module 1a of FIG. 13A with the insulating member 18 omitted. In FIGS. 13A and 13B, the sealing resin 17 is omitted.

As illustrated in FIGS. 13A and 13B, in the capacitor module 1a, the case 11 is not provided with a protrusion, and the insulating member 18 is positioned by being received by the third bus bar 16 at one end on the bottom surface side of a through hole 16f provided in the extending portion 16c. The through hole 16f is provided with a portion whose width decreases from the opening side toward the bottom surface side and a portion having substantially the same constant width as that of the insulating member 18. The insulating member 18 is positioned by the portion having the constant width. Therefore, when the insulating member 18 is inserted from the opening side to the bottom surface side, the insulating member 18 is positioned in the lateral direction (X direction).

According to such configuration, it is not necessary to provide a protrusion on the case 11 and it is only necessary to change the shape of the third bus bar 16, and therefore the insulating member 18 can be positioned with a simple configuration and the manufacturing cost can be reduced. In the case of having the through hole 16f as illustrated in FIGS. 13A and 13B, the insulating member 18 is already positioned in the state of FIG. 12B. Therefore, it is possible to prevent positional displacement of the insulating member 18 with respect to the bus bar or the capacitor when inserting the insulating member 18 into the case 11 as in FIG. 12E. Therefore, the positioning accuracy of the insulating member 18 is improved, and the insulation can be improved.

A capacitor module 1b according to another exemplary aspect of the disclosure will be described.

In this exemplary aspect of the disclosure, points different from other aspects will be mainly described. In one aspect of the disclosure, the identical or equivalent configurations as those described above will be described with the same reference numerals given. In one aspect of the disclosure, description overlapping of aspects described above will be omitted.

Figure 14:
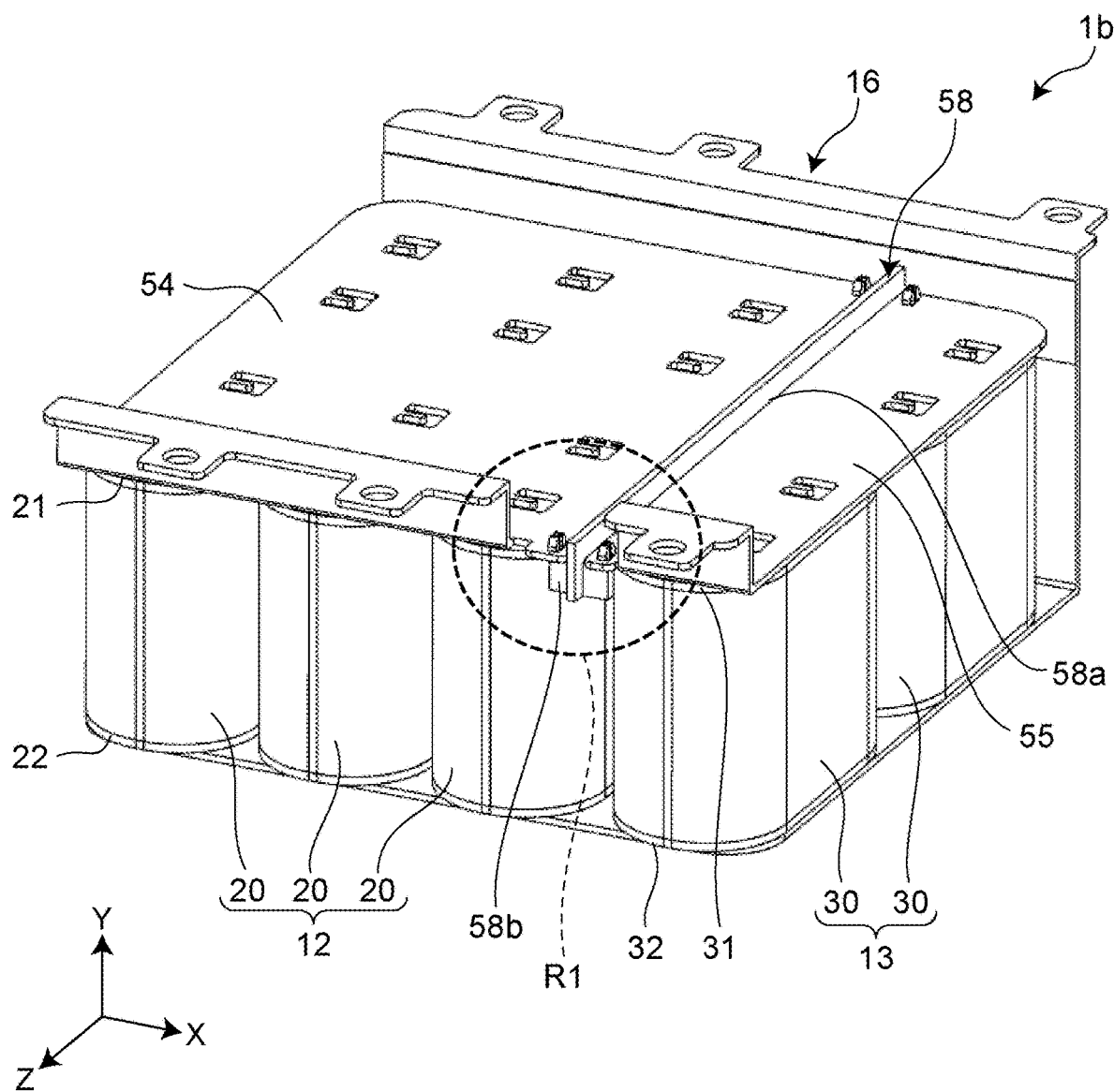
FIG. 14 is a perspective view of the capacitor module in accordance with aspects of the present disclosure with a case and a sealing resin omitted.
Figure 15:
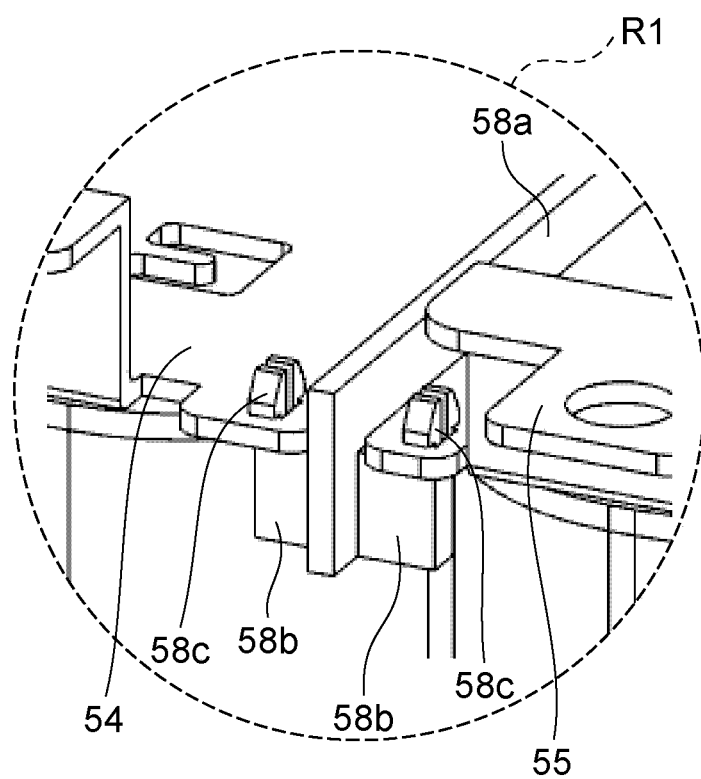
FIG. 15 is an enlarged view of a region R1 of the capacitor module of FIG. 14.
Figure 16:
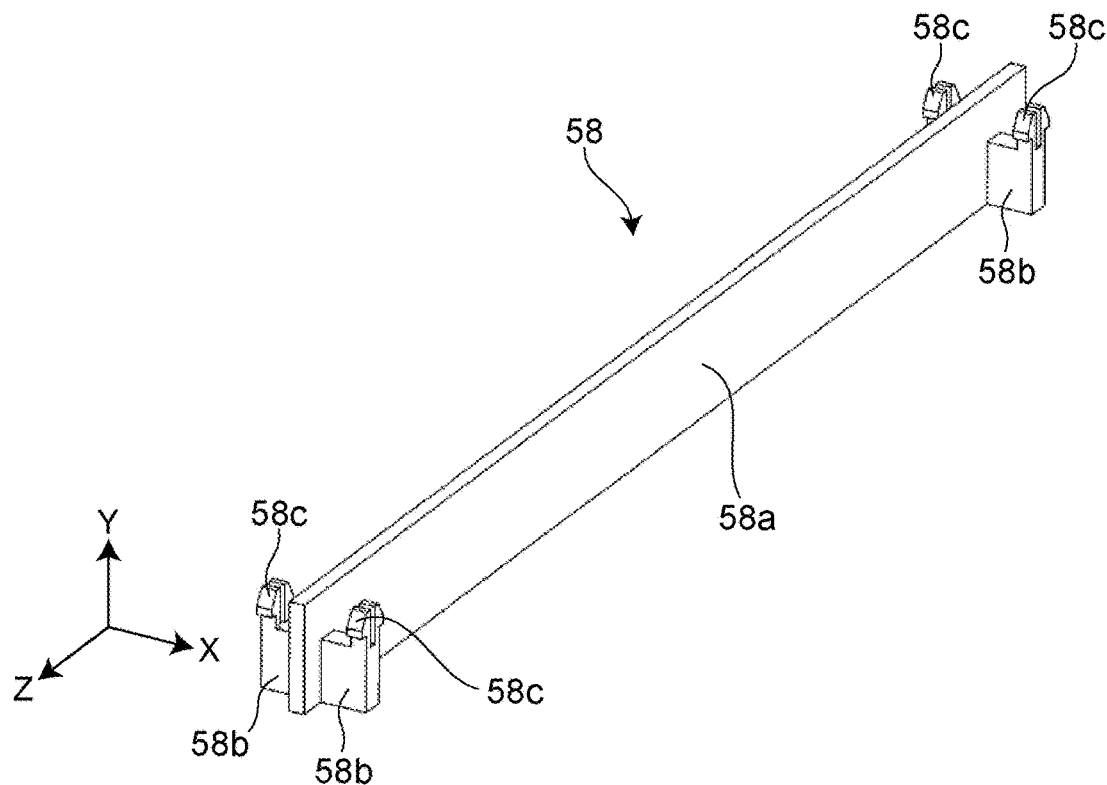
FIG. 16 is a view illustrating an insulating member of the capacitor module of FIG. 14.
Figure 17:
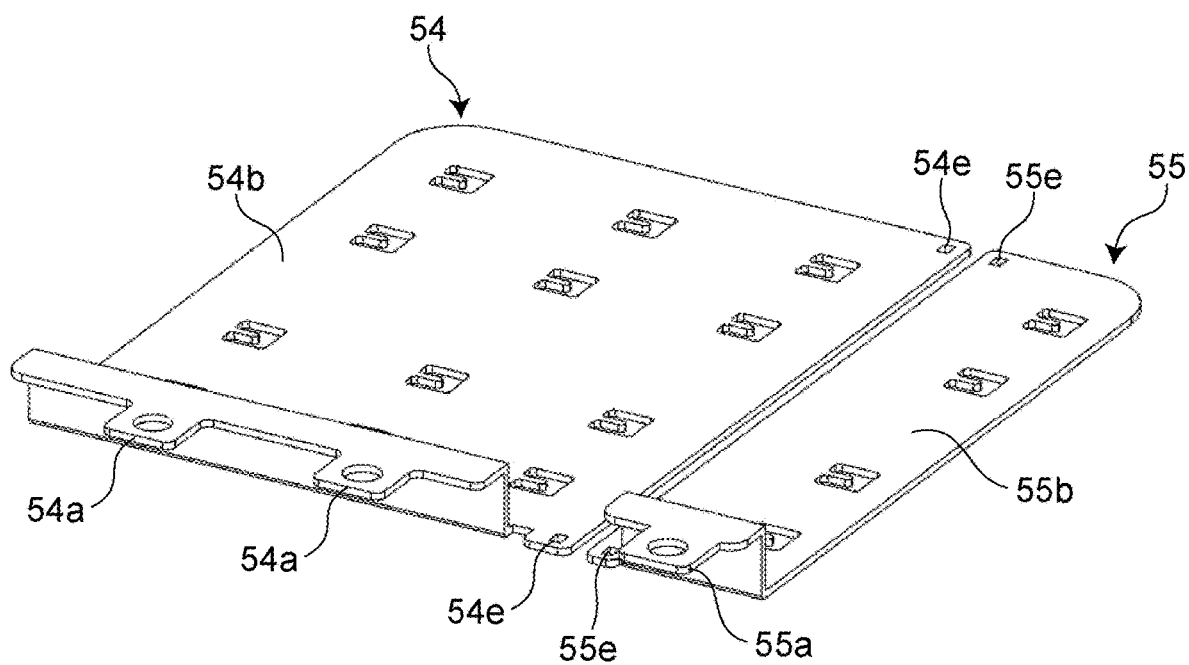
FIG. 17 is a view illustrating a first bus bar and a second bus bar of the capacitor module of FIG. 14.

FIG. 14 is a perspective view of the capacitor module 1b according to one aspect of the disclosure with a case and a sealing resin omitted. FIG. 15 is an enlarged view of the region R1 of the capacitor module 1b of FIG. 14. FIG. 16 is a view illustrating an insulating member 58 of the capacitor module 1b of FIG. 14. FIG. 17 is a view illustrating a first bus bar 54 and a second bus bar 55 of the capacitor module 1b of FIG. 14.

As illustrated in FIGS. 14 and 15, aspects different from the aspects described above in a point that a second portion 58b of the insulating member 58 has a protrusion 58c, and the protrusion 58c is inserted into holes 54e and 55e (see FIG. 17) provided in the first bus bar 54 and the second bus bar 55, respectively.

As illustrated in FIG. 16, the insulating member 58 has two second portions 58b at each of both ends of a first portion 58a. That is, four second portions 58b are provided in the first portion 58a. The protrusion 58c is provided from each second portion 58b of the insulating member 58 toward the +Y direction. The tip end of the protrusion 58c is provided in a hook shape.

As illustrated in FIG. 17, the first bus bar 54 and the second bus bar 55 are provided with the holes 54e and 55e, respectively. Since each protrusion 58c of the second portion 58b of the insulating member 58 is inserted into the hole 54e of the first bus bar 54 or the hole 55e of the second bus bar 55, a hook of the protrusion 58c is caught and fixed to the hole 54e or 55e. That is, each of the protrusion 58c and the hole 54e or 55e is fitted by snap-fitting. In this manner, the insulating member 58 is joined to the first bus bar 54 and the second bus bar 55.

In one aspect of the disclosure, the insulating member 58 is joined and positioned with the first bus bar 54 and the second bus bar 55. Therefore, a protrusion or a through hole for positioning the insulating member 58 is not provided in the case 11 and the third bus bar 16. Since the insulating member 18 is fitted to the first bus bar 54 and the second bus bar 55 by snap-fitting, the insulating member 58 is not provided with a portion that prevents uplift (the second portion 18b of the one aspect), and has a configuration simpler than that of aspects described above.

A manufacturing method of the capacitor module 1b will be described with reference to FIGS. 18A to 18F. FIGS. 18A to 18F are views illustrating the manufacturing process of the capacitor module 1b according to one aspect of the disclosure.

Figure 18A:
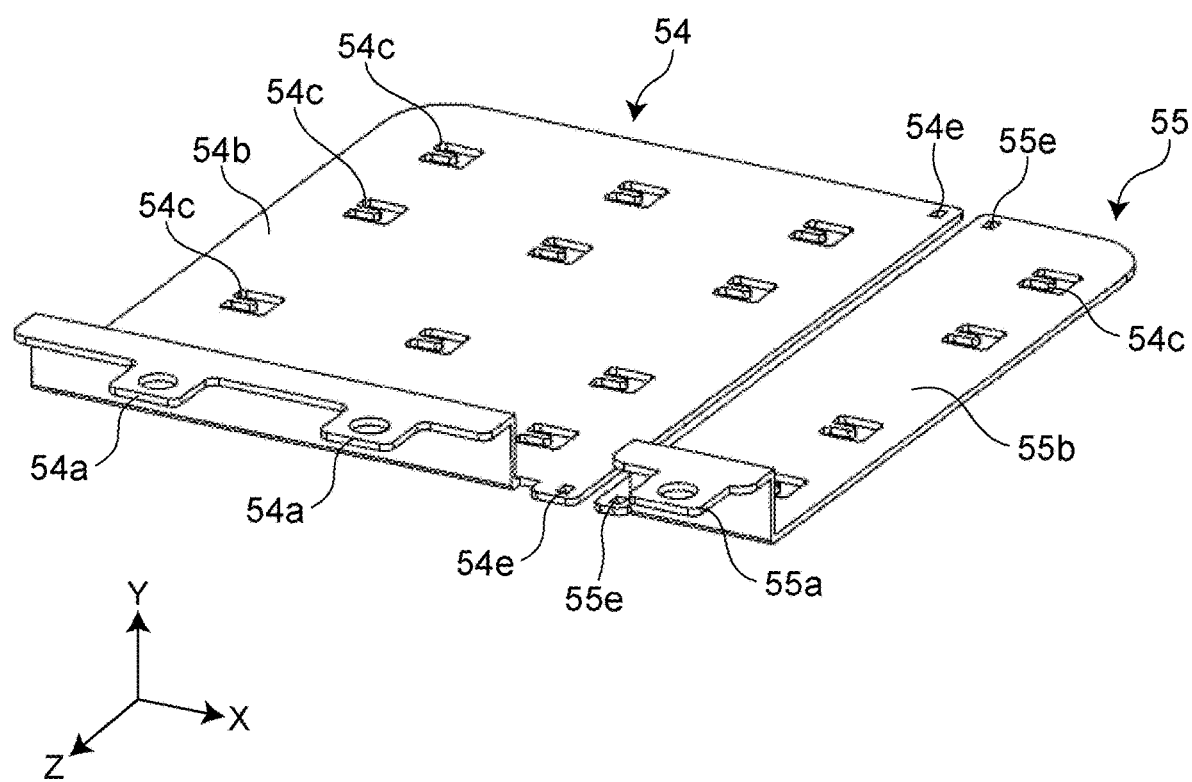
FIG. 18A is a view illustrating a manufacturing process of the capacitor module in accordance with aspects of the present disclosure.

First, the first bus bar 54 and the second bus bar 55 are prepared as illustrated in FIG. 18A. The first bus bar 54 is provided with an electrode contact portion 54b, a terminal 54a, a hole 54c for soldering, and the hole 54e for joining with the insulating member 58. Similarly, the second bus bar 55 is provided with an electrode contact portion 55b, a terminal 55a, a hole 55c for soldering, and the hole 55e for joining with the insulating member 58.

Figure 18B:
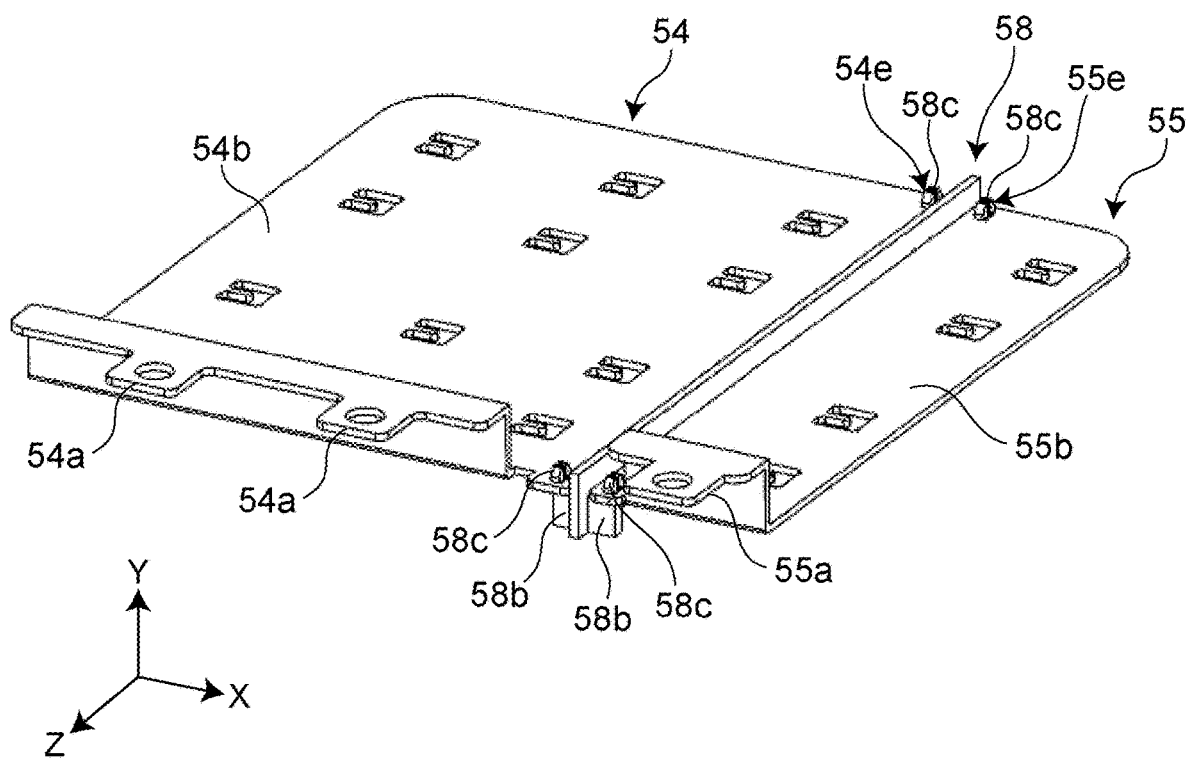
FIG. 18B is a view illustrating the manufacturing process of the capacitor module in accordance with aspects of the present disclosure.

Next, as illustrated in FIG. 18B, the protrusion 58c of the insulating member 58 is inserted into the hole 54e of the first bus bar 54 and the hole 55e of the second bus bar 55. Each protrusion 58c of the insulating member 58 is inserted in the direction (Y direction) from the bottom surface 11b of the case 11 toward the opening 11a. Since the insulating member 58 is joined to the first bus bar 54 and the second bus bar 55 by snap-fitting, the insulating member 58 can be firmly fixed to the first bus bar 54 and the second bus bar 55. When joining the insulating member 18 to the first bus bar 54 and the second bus bar 55 in this manner, it is possible to fix the electrode contact portion 54b of the first bus bar 54 and the electrode contact portion 55b of the second bus bar 55 while keeping them in a substantially identical plane.

Figure 18C:
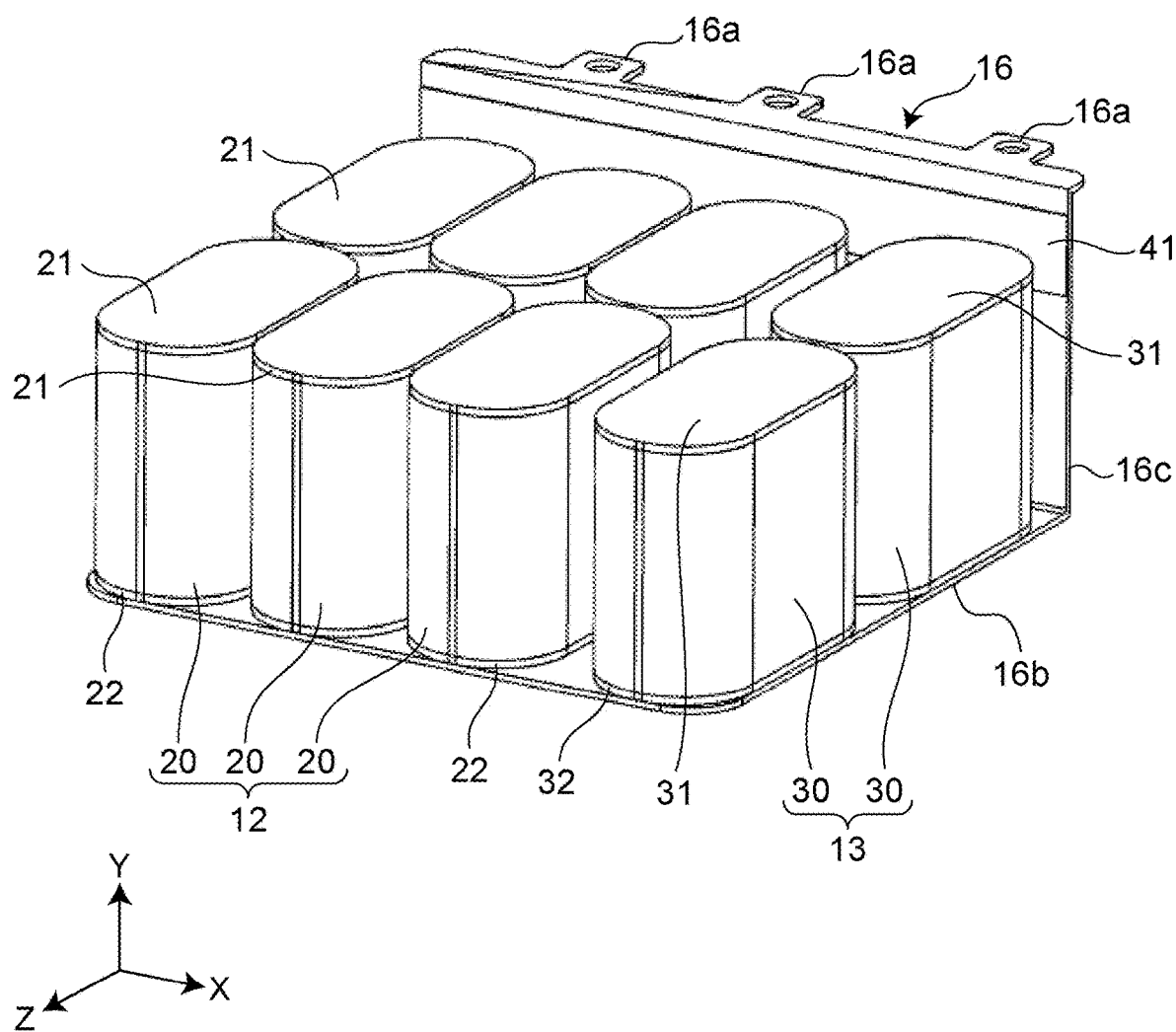
FIG. 18C is a view illustrating the manufacturing process of the capacitor module in accordance with aspects of the present disclosure.
Figure 18D:
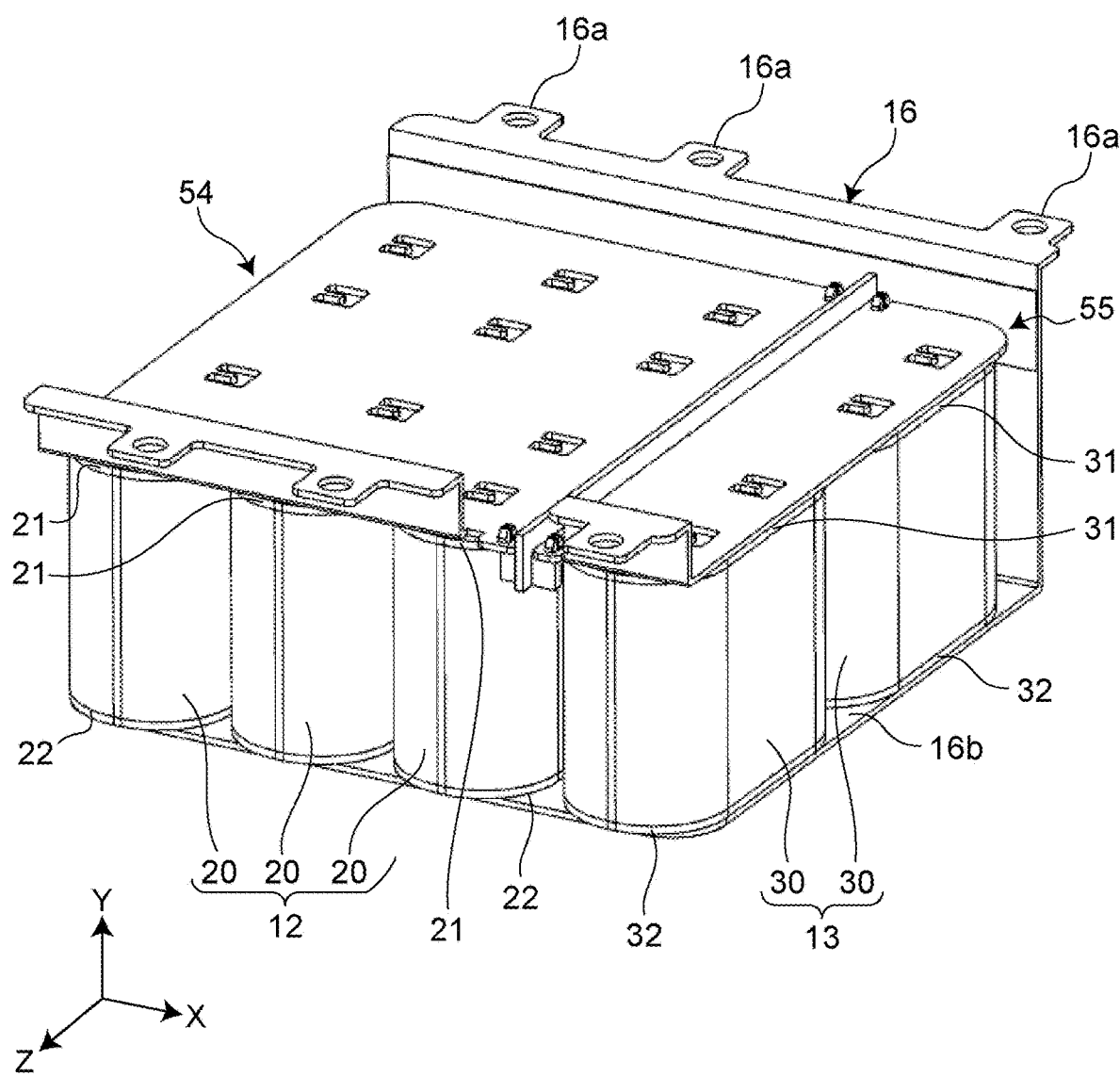
FIG. 18D is a view illustrating the manufacturing process of the capacitor module in accordance with aspects of the present disclosure.

Next, as illustrated in FIG. 18C, each of the first capacitors 20 and second capacitors 30 is disposed in the electrode contact portion 16b of the third bus bar 16. Next, as illustrated in FIG. 18D, the first bus bar 54 and the second bus bar 55 joined to the insulating member 58 in FIG. 18B are disposed in the first capacitor 20 and the second capacitor 30. At this time, unlike exemplary aspects described above, it is not required to dispose the insulating member 58 in the through hole of the third bus bar 16, and it is possible to easily dispose the first bus bar 54 and the second bus bar 55 because they are kept in the substantially identical plane.

After the first bus bar 54 and the second bus bar 55 are disposed, the first bus bar 54 and the first electrode 21 of each of the first capacitors 20, and the second bus bar 55 and the third electrode 31 of each of the second capacitors 30 are connected by solder (not illustrated). The first bus bar 54 and each of the first electrodes 21 are electrically connected by soldering in the hole 54c provided in the electrode contact portion 54b of the first bus bar 54. Similarly, the second bus bar 55 and the third electrode 31 are also soldered in the hole 55c provided in the electrode contact portion 55b of the second bus bar 55, whereby the second bus bar 55 and the third electrode 31 are electrically connected.

Figure 18E:
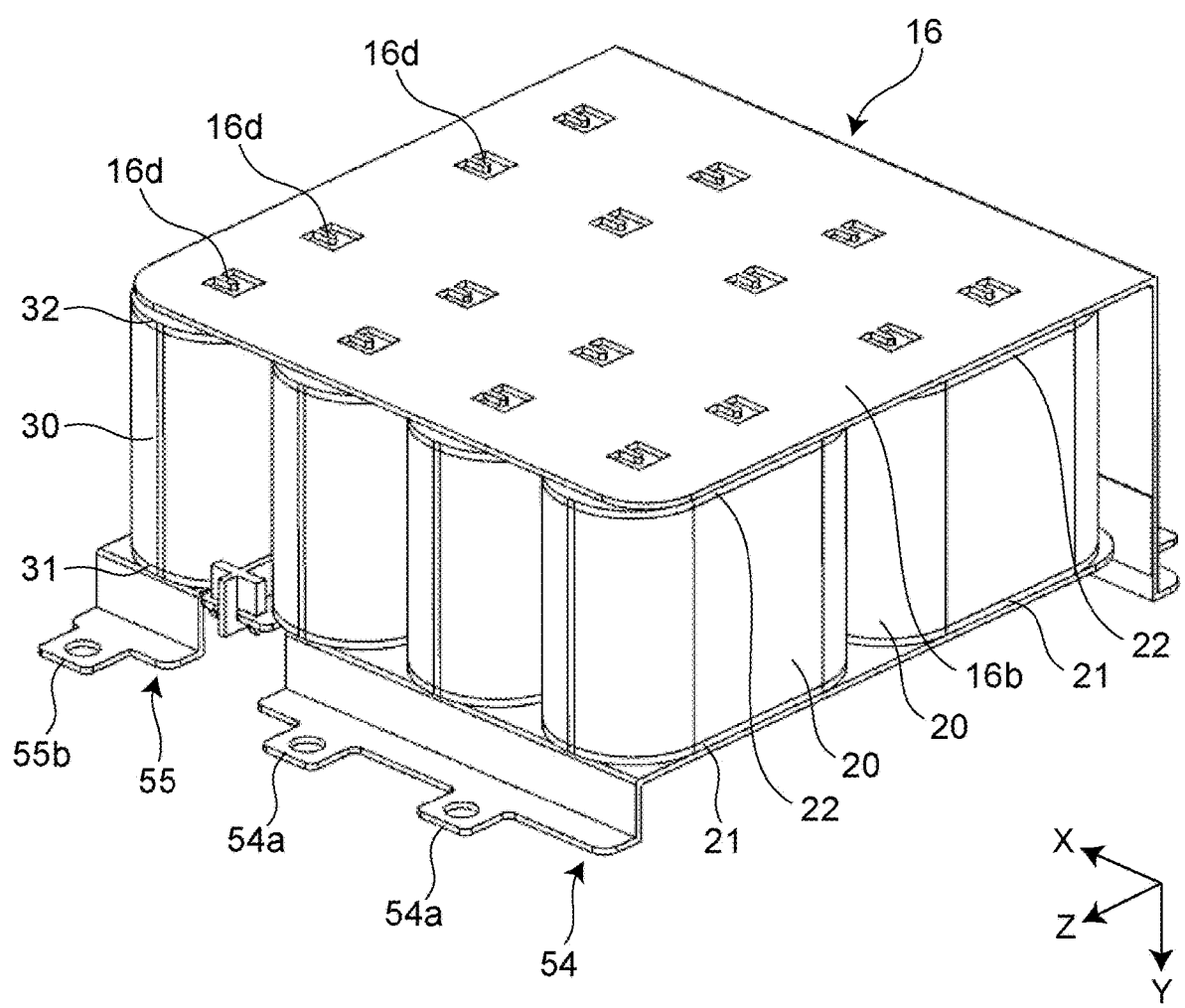
FIG. 18E is a view illustrating the manufacturing process of the capacitor module in accordance with aspects of the present disclosure.

Next, as illustrated in FIG. 18E, the third bus bar 16 is connected to each of the second electrodes 22 and fourth electrodes 32 by solder (not illustrated). The third bus bar 16 is electrically connected to the second electrode 22 and the fourth electrode 32 by soldering in the hole 16d provided in the electrode contact portion 16b of the third bus bar 16.

Figure 18F:
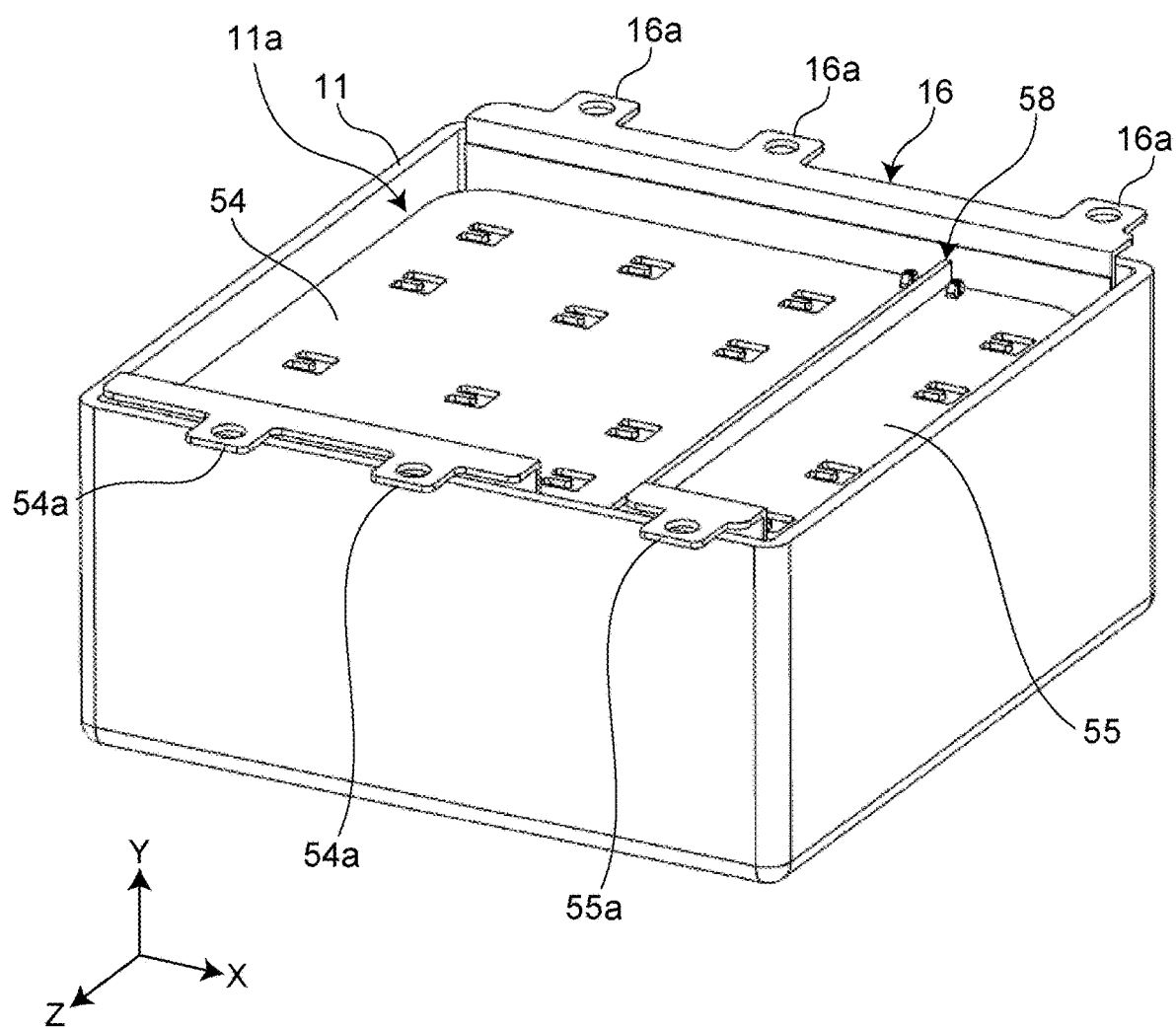
FIG. 18F is a view illustrating the manufacturing process of the capacitor module in accordance with aspects of the present disclosure.

As illustrated in FIG. 18F, each of the first capacitors 20 and second capacitors 30, the first bus bar 54, the second bus bar 55, the third bus bar 16, and the insulating member 58 that have been soldered are inserted into the case 11. At this time, no protrusion is provided on the case 11, and alignment between the insulating member 58 and the case 11 is unnecessary, and therefore arrangement is easy.

Figure 18G:
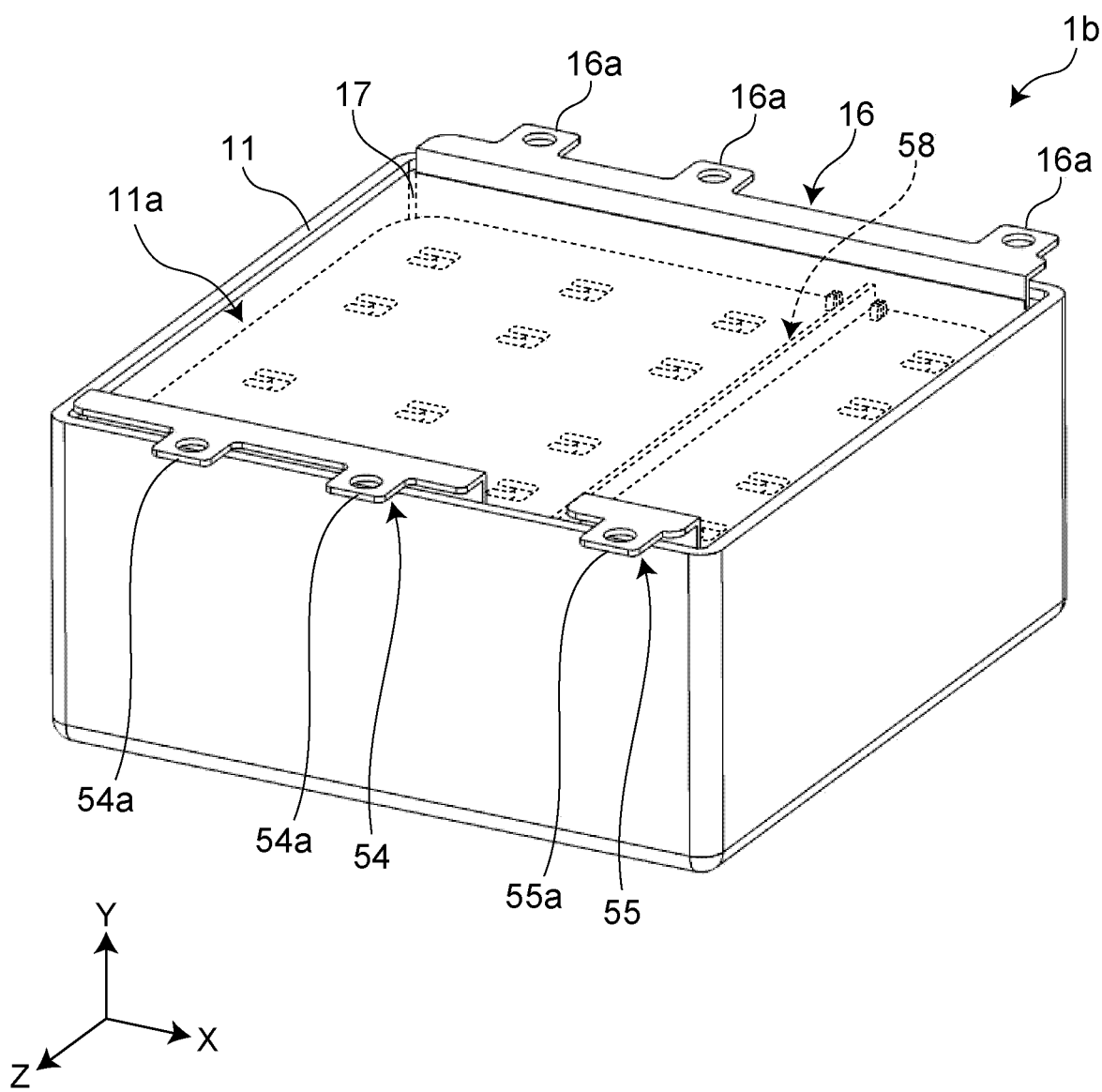
FIG. 18G is a view illustrating the manufacturing process of the capacitor module in accordance with aspects of the present disclosure.

After insertion into the case 11, as illustrated in FIG. 18G, the case 11 is filled with the sealing resin 17, and the sealing resin 17 is cured to complete the capacitor module 1b. At this time, the protrusion 58c of the insulating member 58 is inserted into each of the holes 54e and 55e. Therefore, it is possible to prevent the insulating member 58 from uplifting due to the buoyancy of the sealing resin 17 without separately providing an uplift prevention structure (e.g., the second portion 18b of the exemplary aspects described above) of the insulating member 58.

According to the capacitor module 1b according to one aspect of the disclosure, it is possible to achieve the following effects.

The second portion 58b of the insulating member 58 of the capacitor module 1b has the protrusion 58c, and is inserted into the holes 54e and 55e provided in first bus bar 54 and the second bus bar 55, respectively.

Such configuration makes it easy to position the insulating member 58.

Moreover, a capacitor module 1c according to a modification of aspects will be described with reference to FIGS. 19 to 21.

Figure 19:
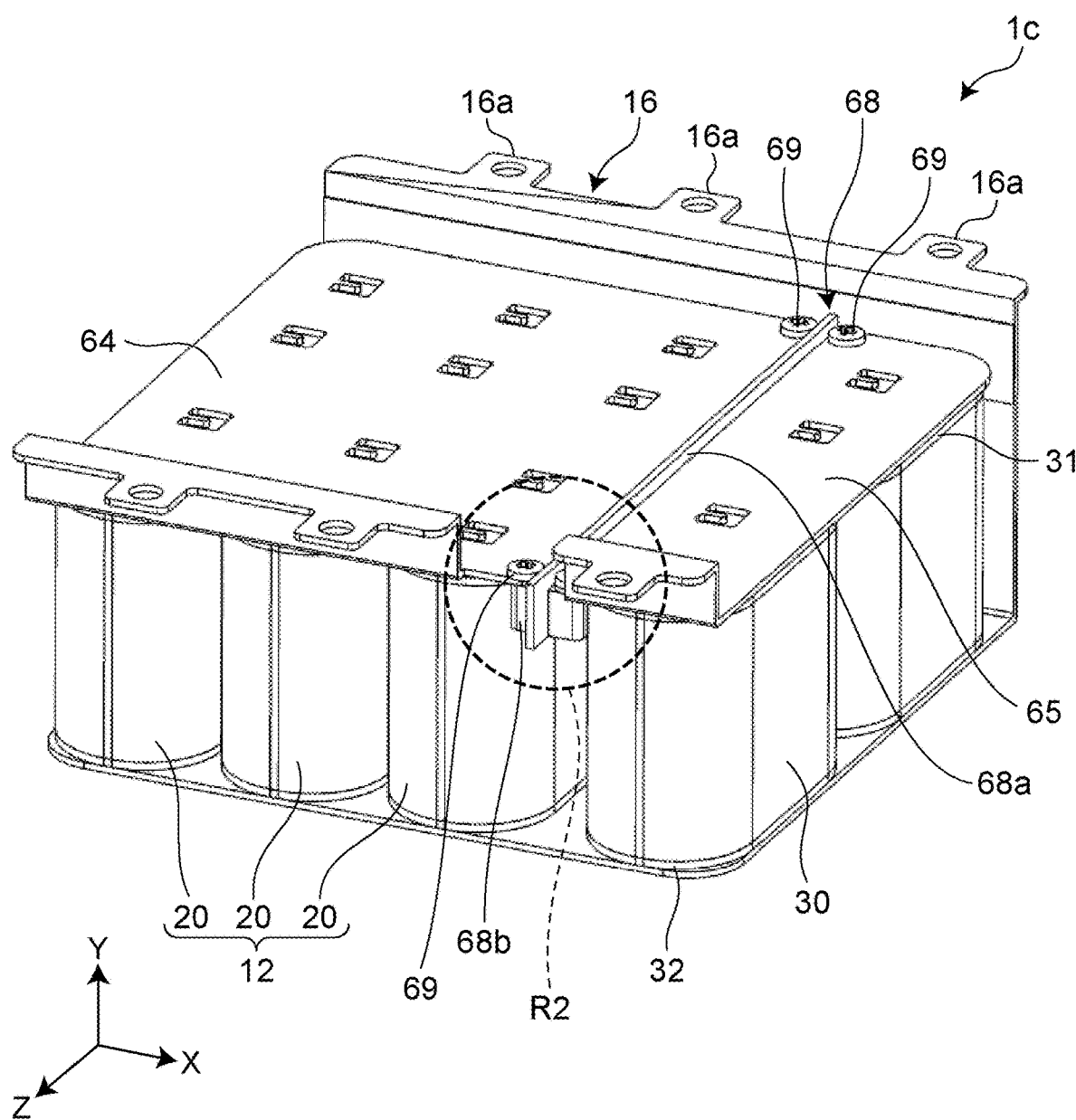
FIG. 19 is a perspective view of the capacitor module according to a modification of and aspect of the disclosure with the case and the sealing resin omitted.

FIG. 19 is a perspective view of the capacitor module 1c according to a modification of exemplary aspects with the case and the sealing resin omitted. FIG. 20 is an enlarged view of the region R2 of the capacitor module 1c of FIG. 19. FIG. 21 is a view illustrating a first bus bar 64, a second bus bar 65, and an insulating member 68 of the capacitor module 1c of FIG. 19.

While in the capacitor module 1b of one exemplary aspect of the disclosure, the insulating member 58 is joined to the first bus bar 54 and the second bus bar 55 by the snap-fit structure, they are joined by screws in the capacitor module 1c.

Figure 20:
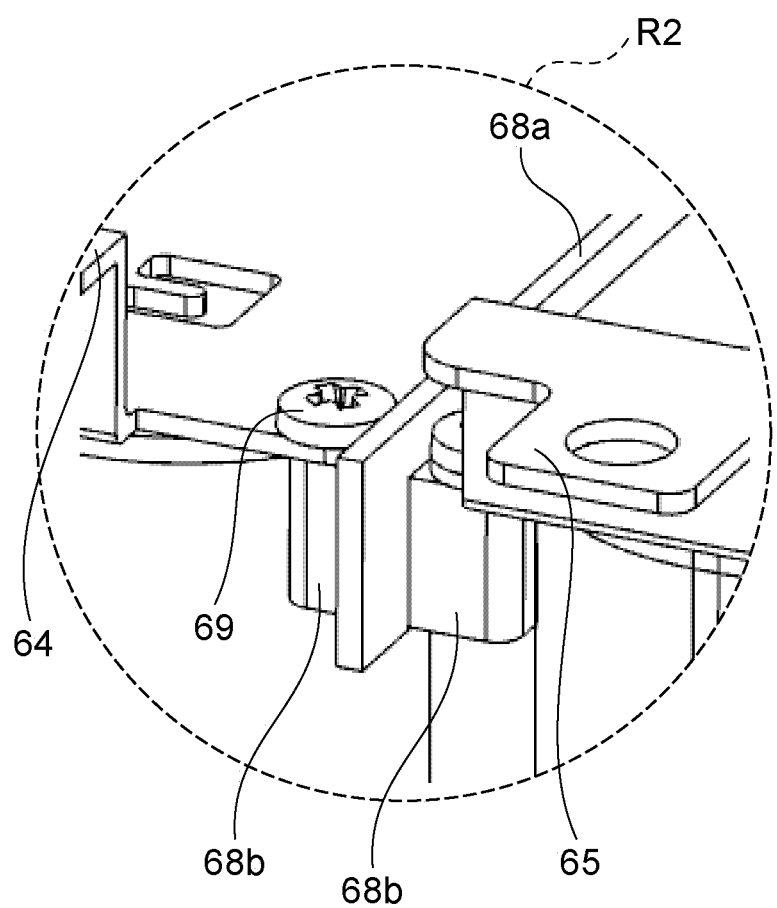
FIG. 20 is an enlarged view of a region R2 of the capacitor module of FIG. 19.

As illustrated in FIGS. 19 and 20, the insulating member 68 is joined to the first bus bar 64 and the second bus bar 65 by four screws 69.

Figure 21:
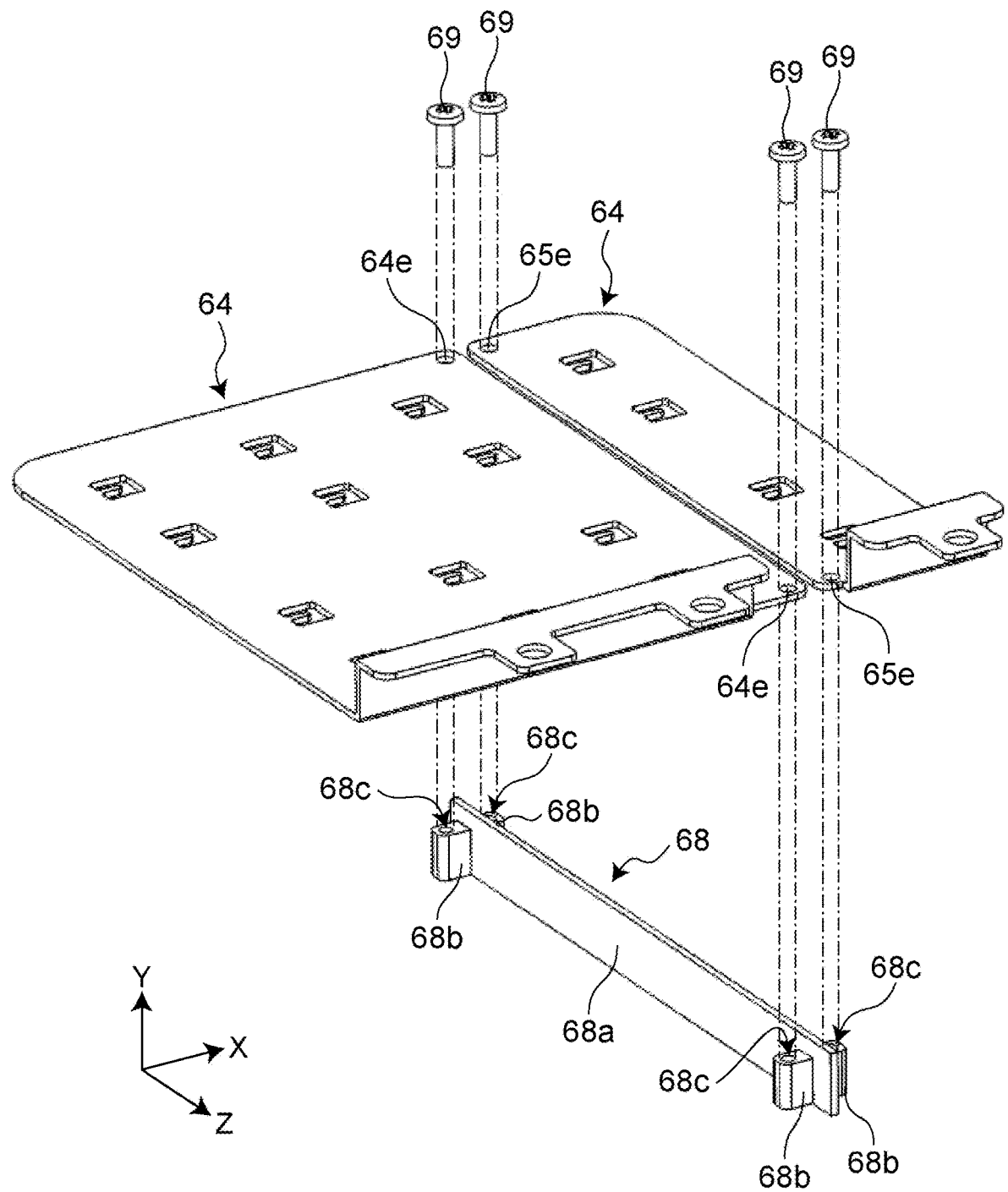
FIG. 21 is a view illustrating a first bus bar, a second bus bar, and an insulating member of the capacitor module of FIG. 19.

More specifically, as illustrated in FIG. 21, a second portion 68b of the insulating member 68 has a recess 68c. The first bus bar 64 and the second bus bar 65 are provided with circular holes 64e and 65e, respectively. The capacitor module 1c further has the screws 69 inserted into the holes 64e and 65e provided in the first bus bar 64 and the second bus bar 65 and the recesses 68c respectively.

Such configuration makes it possible to more firmly fix the insulating member 68, the first bus bar 64, and the second bus bar 65 as compared with the snap-fitting. It is possible to improve the positioning accuracy of the insulating member 68.

The present disclosure is useful for capacitors used in various electronic equipment, electric equipment, industrial equipment, vehicle devices, and the like.

In general, the description of the aspects disclosed should be considered as being illustrative in all respects and not being restrictive. The scope of the present disclosure is shown by the claims rather than by the above description, and is intended to include meanings equivalent to the claims and all changes in the scope. While preferred aspects of the disclosure have been described above, it is to be understood that variations and modifications will be apparent to those skilled in the art without departing from the scope and spirit of the disclosure.

What is claimed is:

1. A capacitor module comprising:
   a case with an opening disposed at a position opposing a bottom surface;
   a first capacitor group disposed inside the case and including a first capacitor having a first electrode, a second electrode, and a side surface connecting the first electrode and the second electrode;
   a second capacitor group disposed inside the case and including a second capacitor having a third electrode, a fourth electrode, and a side surface connecting the third electrode and the fourth electrode;
   a first bus bar having a plate shape and being disposed on a side of the opening with respect to the first capacitor group inside the case and having an electrode contact portion in contact with the first electrode;
   a second bus bar having a plate shape and being disposed on a side of the opening with respect to the second capacitor group inside the case and having an electrode contact portion in contact with the third electrode;
   a third bus bar disposed on a bottom surface side with respect to the first capacitor group and the second capacitor group inside the case and having an electrode contact portion commonly in contact with the second electrode and the fourth electrode, wherein the third bus bar has an extending portion extending to an outside of the case through the opening along a side surface of the case from the electrode contact portion of the third bus bar; and
   an insulating member disposed between the electrode contact portion of the first bus bar and the electrode contact portion of the second bus bar and surrounded by a sealing resin.

2. The capacitor module according to claim 1, wherein the insulating member is disposed such that, in a direction from the opening toward the bottom surface, one end portion is positioned on a side of the opening with respect to the electrode contact portion of the first bus bar and the electrode contact portion of the second bus bar, and another end portion is positioned on the bottom surface side relative to the first electrode and the third electrode.

3. The capacitor module according to claim 1, wherein a recess that receives the insulating member in a direction from the opening toward the bottom surface is provided on an inner side surface of the case.

4. The capacitor module according to claim 1, further comprising a through hole through which the insulating member passes is provided in the extending portion.

5. The capacitor module according to claim 4, wherein the insulating member is positioned by being received by the third bus bar at one end on the bottom surface side of the through hole.

6. The capacitor module according to claim 1, wherein the insulating member includes:
   a first portion extending between the electrode contact portion of the first bus bar and the electrode contact portion of the second bus bar, and
   a second portion extending so as to intersect with respect to the first portion and extending so as to be positioned on the bottom surface side of the case with respect to a surface on the first electrode side of the electrode contact portion of the first bus bar and a surface on the third electrode side of the electrode contact portion of the second bus bar.

7. The capacitor module according to claim 6, wherein the first capacitor includes a plurality of first capacitors, and the second capacitor includes a plurality of second capacitors.

8. The capacitor module according to claim 7, wherein:
   the side surface of the first capacitor and the side surface of the second capacitor each include a pair of flat portions opposing each other and a pair of curved portions connecting the pair of flat portions, and
   the second portion of the insulating member is disposed between the pair of curved portions of the plurality of first capacitors and between the pair of curved portions of the plurality of second capacitors.

9. The capacitor module according to claim 6, wherein the second portion of the insulating member has a protrusion that is inserted into a hole provided in each of the first bus bar and the second bus bar.

10. The capacitor module according to claim 6, wherein the second portion of the insulating member has a recess, and
   the capacitor module further comprises a screw inserted into a hole provided in each of the first bus bar and the second bus bar and the recess.

11. The capacitor module according to claim 1, wherein the bottom surface of the case is flat.

12. The capacitor module according to claim 1, wherein the case is filled with the sealing resin.

13. The capacitor module according to claim 1, wherein the sealing resin is at least one of a polyphenylene sulfide (PPS resin) or a polybutylene terephthalate (PBT resin).

14. A method of manufacturing a capacitor module comprising:
   disposing a first bus bar on a bottom surface side with respect to a first capacitor group and a second capacitor group inside a case and having an electrode contact portion commonly in contact with a second electrode and a fourth electrode;
   disposing the first capacitor group on the first bus bar, where the first capacitor group includes one first capacitor and having a first electrode, the second electrode, and a side surface connecting the first electrode and the second electrode;

disposing the second capacitor group on the first bus bar, where the second capacitor group includes one second capacitor and having a third electrode, the fourth electrode, and a side surface connecting the third electrode and the fourth electrode;

disposing a second bus bar having a plate shape on a first side and having an electrode contact portion in contact with the first electrode;

disposing a third bus bar having a plate shape on a second side and having an electrode contact portion in contact with the third electrode, wherein the third bus bar has an extending portion extending to an outside of the case through an opening along a side surface of the case from the electrode contact portion of the third bus bar;

disposing an insulating member between the electrode contact portion of the second bus bar and the electrode contact portion of the third bus bar and surrounded by a sealing resin; and disposing in the case an opening provided at a position opposing the bottom surface side, wherein the first bus bar has an extending portion that extends to an outside of the case through the opening along a side surface of the case from the electrode contact portion of the first bus bar, and a through hole through which the insulating member passes is provided in the extending portion.

15. The method of manufacturing the capacitor module according to claim 14, further comprising disposing the insulating member such that, in a direction from the opening toward the bottom surface side, one end portion is positioned on a side of the opening with respect to the electrode contact portion of the second bus bar and the electrode contact portion of the third bus bar, and another end portion is positioned on the bottom surface side relative to the first electrode and the third electrode.

16. The method of manufacturing the capacitor module according to claim 14, further comprising receiving the insulating member in a recess in a direction from the opening toward the bottom surface side provided on an inner side surface of the case.

17. The method of manufacturing the capacitor module according to claim 14, wherein the insulating member is positioned by being received by the first bus bar at one end on the bottom surface side of the through hole.

18. The method of manufacturing the capacitor module according to claim 14, wherein the first capacitor group includes a plurality of first capacitors, and the second capacitor group includes a plurality of second capacitors.

* * * * *